US012450362B2

(12) United States Patent
Madison, Jr. et al.

(10) Patent No.: US 12,450,362 B2
(45) Date of Patent: Oct. 21, 2025

(54) SYSTEMS AND METHODS FOR IMPROVING VULNERABILITY MANAGEMENT

(71) Applicant: Capital One Services, LLC, McLean, VA (US)

(72) Inventors: Thaddeus Madison, Jr., Richmond, VA (US); Biswash Ghimire, East Lansing, MI (US); Anna Graves, Richmond, VA (US)

(73) Assignee: Capital One Services, LLC, McLean, VA (US)

( * ) Notice: Subject to any disclaimer, the term of this patent is extended or adjusted under 35 U.S.C. 154(b) by 274 days.

(21) Appl. No.: 18/296,352

(22) Filed: Apr. 5, 2023

(65) Prior Publication Data

US 2024/0338455 A1 Oct. 10, 2024

(51) Int. Cl.
*G06F 21/57* (2013.01)
*H04L 9/40* (2022.01)

(52) U.S. Cl.
CPC ........ *G06F 21/577* (2013.01); *H04L 63/1425* (2013.01); *H04L 63/1433* (2013.01)

(58) Field of Classification Search
CPC .................. H04L 63/1425; H04L 63/1433; G06F 21/577
See application file for complete search history.

(56) References Cited

U.S. PATENT DOCUMENTS

| 9,800,605 | B2* | 10/2017 | Baikalov | H04L 63/1433 |
| 10,628,764 | B1* | 4/2020 | Kaplan | G06Q 10/063112 |
| 11,831,670 | B1* | 11/2023 | Molls | G06F 8/65 |
| 2017/0034023 | A1* | 2/2017 | Nickolov | H04L 43/0817 |
| 2018/0004942 | A1* | 1/2018 | Martin | G06F 21/554 |
| 2019/0362076 | A1* | 11/2019 | Wang | G06Q 30/0207 |
| 2021/0099476 | A1* | 4/2021 | Montgomery | H04L 63/1425 |
| 2021/0103058 | A1* | 4/2021 | Dries | G01S 19/22 |
| 2021/0201418 | A1* | 7/2021 | Mehedy | H04L 63/12 |
| 2022/0070086 | A1* | 3/2022 | Mermoud | H04L 41/40 |
| 2022/0156383 | A1* | 5/2022 | Schwarzbauer | G06F 21/566 |
| 2022/0164645 | A1* | 5/2022 | Zaina | G06N 3/044 |
| 2022/0164892 | A1* | 5/2022 | Venter | H04L 63/1408 |
| 2022/0329630 | A1* | 10/2022 | Li | G06F 21/577 |

OTHER PUBLICATIONS

Malladi et al., âBug Bounty Programs for Cybersecurity: Practices, Issues, and Recommendationsâ, Published Jan. 1, 2020 (Year: 2020).*

* cited by examiner

*Primary Examiner* — Tod R Swann
*Assistant Examiner* — Amir Mahdi Hajiabbasi
(74) *Attorney, Agent, or Firm* — Foley & Lardner LLP

(57) ABSTRACT

Methods and systems are described herein for novel uses and/or improvements to artificial intelligence applications for vulnerability management. Additionally, methods and systems are described herein for contextualizing the importance of finding a patch for a vulnerability and helping to prioritize vulnerabilities to patch. As one example, methods and systems are described herein for generating a ranking of vulnerabilities based on the risk score and a corresponding compensation amount to incentivize individuals to find patches for vulnerabilities. Additionally, methods and systems are described to determine a computing environment specific risk score for vulnerabilities detected within the computing environment.

19 Claims, 7 Drawing Sheets

SYSTEMS AND METHODS FOR IMPROVING VULNERABILITY MANAGEMENT

BACKGROUND

In recent years, the use of artificial intelligence, including, but not limited to, machine learning, deep learning, etc. (referred to collectively herein as artificial intelligence models, machine learning models, or simply models) has exponentially increased. Broadly described, artificial intelligence refers to a wide-ranging branch of computer science concerned with building smart machines capable of performing tasks that typically require human intelligence. Key benefits of artificial intelligence are its ability to process data, find underlying patterns, and/or perform real-time determinations. However, despite these benefits and despite the wide-ranging number of potential applications, practical implementations of artificial intelligence have been hindered by several technical problems. First, artificial intelligence may rely on large amounts of high-quality data. The process for obtaining this data and ensuring it is high-quality can be complex and time-consuming. Additionally, data that is obtained may need to be categorized and labeled accurately, which can be difficult, time-consuming, and a manual task. Second, despite the mainstream popularity of artificial intelligence, practical implementations of artificial intelligence may require specialized knowledge to design, program, and integrate artificial intelligence-based solutions, which can limit the number of people and resources available to create these practical implementations. Finally, results based on artificial intelligence can be difficult to review as the process by which the results are made may be unknown or obscured. This obscurity can create hurdles for identifying errors in the results, as well as improving the models providing the results. These technical problems may present an inherent problem with attempting to use an artificial intelligence-based solution in generating a ranking of vulnerabilities based on the risk score and corresponding compensation amount to incentivize individuals to find patches for vulnerabilities and in determining the value of patching a vulnerability within a computing environment.

SUMMARY

Methods and systems are described herein for novel uses and/or improvements to artificial intelligence applications for vulnerability management. As one example, methods and systems are described herein for generating a ranking of vulnerabilities based on the risk score to triage vulnerabilities and a corresponding compensation amount to incentivize individuals to find patches for vulnerabilities.

Existing systems may not rank vulnerabilities using a risk score generated using an aggregation of data sources which could lead to an inaccurate or incomplete evaluation metric. For example, existing systems may only leverage one metric (e.g., qualitative assessments of a vulnerability such as the Common Vulnerability Scoring System (CVSS) or qualitative assessments from the National Vulnerability Database (NVD)) without regard to other external or internal metrics. Existing systems may also rely on other preexisting frameworks to determine the risk a vulnerability poses to a computing environment without considering other risk metrics. However, the difficulty in adapting artificial intelligence models for this practical benefit faces several technical challenges such as how to determine whether or not a particular vulnerability has been exploited within a computing environment and/or whether or not a detected issue is the result of a particular vulnerability. It is difficult to determine whether or not a particular vulnerability has been exploited because the characteristics of the detected issue may be a result of one or more vulnerabilities or a result of something else entirely, such as user error.

To overcome these technical deficiencies in adapting artificial intelligence models for this practical benefit, methods and systems disclosed herein generate a risk score by determining a number of times a vulnerability is observed in a computing environment. By incorporating the number of times that a vulnerability is observed within a computing environment into generating a risk score, the system reduces the risk that the evaluation metric is inaccurate or incomplete for a given computing environment which may be the case when using traditional methods. For example, the system determines a number of times a vulnerability is observed in a computing environment by retrieving a first digital artifact corresponding to the vulnerability. By retrieving a first digital artifact corresponding to the vulnerability, the system is able to ensure that a vulnerability observed multiple times in a computing environment is the same vulnerability. Accordingly, the methods and systems provide the practical benefit of generating a ranking of vulnerabilities based on the risk score and a corresponding compensation amount to incentivize individuals to find patches for vulnerabilities.

In some aspects, methods and systems are designed to determine risk scores for vulnerabilities by determining a number of attempted exploits in computing environments by detecting a current alert in a computing environment; determining a current digital artifact corresponding to the current alert, wherein the current digital artifact comprises digital forensic evidence; determining a known vulnerability, wherein the known vulnerability comprises a known digital artifact and a public risk score; determining whether the current alert is the known vulnerability by comparing the current digital artifact to the known digital artifact; based on determining that the current alert is caused by the known vulnerability, incrementing a counter, wherein the counter corresponds to a number of times the known vulnerability has been exploited in the computing environment; determining a risk score for the known vulnerability, wherein the risk score is based on the counter, the known digital artifact and the public risk score; receiving a plurality of proposed patches, wherein at least a portion of the plurality of proposed patches fixes flaws in the computing environment; and generating for display, on a user interface, a ranking of alerts, wherein the ranking of alerts comprises the current alert and the plurality of proposed patches, wherein the current alert is sorted by the risk score, wherein the plurality of proposed patches are sorted by a popularity metric, and wherein the popularity metric describes community support for each proposed patch in the plurality of proposed patches.

As another example, methods and systems are described herein for contextualizing the importance of finding a patch for a vulnerability and may help prioritize vulnerabilities to patch. Determining the value of patching a vulnerability may also lead to a change in the compensation amount associated with the vulnerability. Furthermore, determining the value of patching a vulnerability by using a compensation amount may help the system exceed the performance of other systems as other systems may not incentivize users adequately or generate inferior compensation estimates as a result of superficial data sources (e.g., only one data source).

Furthermore, existing systems may not contextualize the importance of finding a patch for a vulnerability based on aggregating data to generate a valuation metric. Existing systems may rely solely on statistics in a computing environment or solely on external risk metrics. For example, existing systems may have trouble determining what data to query to generate a valuation metric. However, the difficulty in adapting artificial intelligence models for this practical benefit faces several technical challenges, such as how to determine the frequency at which a vulnerability is exploited in a computing environment to use in generating the valuation metric, is itself difficult. For example, in modern computing environments, determining whether or not a particular vulnerability has been exploited and/or whether or not a detected issue is the result of a particular vulnerability is difficult because the characteristics of the detected issue may be a result of one or more vulnerabilities, or a result of something else entirely.

To overcome these technical deficiencies in adapting artificial intelligence models for this practical benefit, methods and systems disclosed herein determine the frequency at which exploits are attempted corresponding to a particular vulnerability in a computing environment. Methods and systems disclosed herein use the frequency to produce a valuation score as an output. The model overcomes the challenge of how to determine the frequency of a specific vulnerability exploited in a computing environment by identifying a digital artifact and comparing the current digital artifact to the known digital artifact. For example, the system may provide a corresponding importance for finding a patch for a vulnerability by comparing the current digital artifact to the known digital artifact. By identifying recurring vulnerabilities, the system is able to determine the frequency of a specific vulnerability within a computing environment and produce a valuation score as an output. By using the rate of frequency of exploit attempts corresponding to the vulnerability to produce a valuation score, the system can provide a holistic approach to security ensuring that important and valuable vulnerabilities are prioritized. Accordingly, the methods and systems may help contextualize the importance of finding a patch for a vulnerability and may help prioritize vulnerabilities to patch in a computing environment. Determining the value of patching a vulnerability may also lead to a change in the incentivization offer given for patching the vulnerability. Furthermore, determining the value of patching a vulnerability by using a compensation amount may help the system exceed the performance of other systems as other systems may not incentivize users adequately or generate inferior compensation estimates as a result of superficial data sources (e.g., only one data source).

In some aspects, methods and systems are designed to generate a valuation score for a vulnerability by determining a frequency of attempted exploits within periods of time by detecting a current alert in a computing environment; determining a current digital artifact corresponding to the current alert, wherein the current digital artifact comprises digital forensic evidence; determining a known vulnerability, wherein the known vulnerability comprises a known digital artifact and a public risk score; determining whether the current alert is the known vulnerability by comparing the current digital artifact to the known digital artifact; based on determining that the current alert is caused by the known vulnerability, adjusting a rate of frequency, wherein the rate of frequency corresponds to a number of times the known vulnerability has been exploited over a period of time; determining a risk score and a valuation for the known vulnerability, wherein the risk score is based on the rate of frequency, the known digital artifact, and the public risk score, and wherein the valuation is based on the risk score; receiving a plurality of proposed patches, wherein at least a portion of the plurality of proposed patches fixes flaws in the computing environment; and generating for display, on a user interface, a ranking of alerts, wherein the ranking of alerts comprises the current alert and the plurality of proposed patches, wherein the current alert is sorted by the risk score, wherein the plurality of proposed patches are sorted by a popularity metric, and wherein the popularity metric describes community support for each proposed patch in the plurality of proposed patches.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
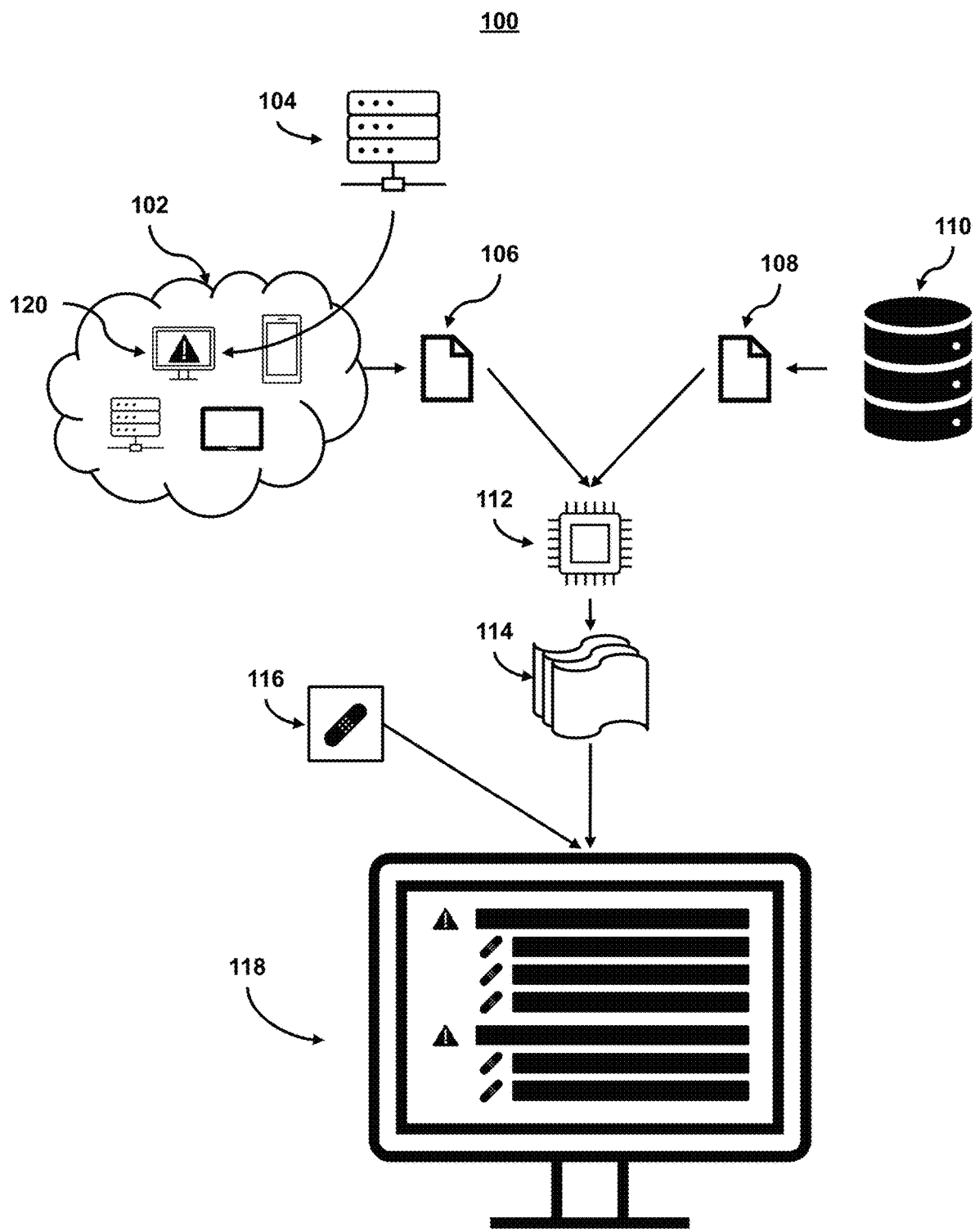
FIG. 1 shows an illustrative diagram for generating a ranking for vulnerabilities and contextualizing the importance of finding a patch within a computing environment to better prioritize resources allocated to finding a patch, in accordance with one or more embodiments.

FIG. 1 shows an illustrative diagram for generating a ranking for vulnerabilities and contextualizing the importance of finding a patch within a computing environment to better prioritize resources allocated to finding a patch, in accordance with one or more embodiments. For example, system 100 may include server 104 which may host one or more vulnerability scanners that scan computing environment 102 for one or more vulnerabilities. When server 104 detects a vulnerability on a user device in computing environment 102 (e.g., alert 120), server 104 may also identify a digital artifact corresponding to the current alert (e.g., current digital artifact 106). The system may also reference an external database (e.g., external database 110) which may include known digital artifacts (e.g., known digital artifact 108). By aggregating information from computing environment 102 and information from external database 110, system 100 can provide a holistic approach to vulnerability ranking and general risk assessment thereby increasing the likelihood that high-risk vulnerabilities are patched quickly, and the computing environment is more secure. For example, FIG. 1 illustrates model 112 which takes current digital artifact 106 and known digital artifact 108 as inputs to produce output 114. Output 114 may include a determination of a known vulnerability based on current digital artifact 106, known digital artifact 108, and a public risk score. Based on the assessment, if the vulnerability that model 112 identifies matches the vulnerability associated with the known digital artifact, then the model may adjust an internal metric (e.g., a counter incrementing each time the vulnerability is observed in the computing system, or a metric identifying the frequency of attempted exploits of the vulnerability in the computing system). Model 112 may also use the internal metric, in conjunction with known digital artifact 108, and a public risk score (e.g., a public risk score obtained from an external source) to determine a risk score for the known vulnerability associated with known digital artifact 108. After determining the risk score for the vulnerability, the system may receive multiple proposed patches to fix the vulnerability (e.g., proposed patches 116). After receiving the patches, the system may generate a user interface (e.g., user interface 118) to display all alerts detected within the computing environment ranked based on the risk score in addition to the proposed patches for the vulnerability and a metric detailing the popularity of the patch. For example, the system may identify a vulnerability based on a known digital artifact, obtain patches for the vulnerability, allow community members or a cybersecurity expert to review the patch for validity and effectiveness, and subsequently choose an appropriate patch for the vulnerability associated with the digital artifact detected in the computing environment (e.g., a patch for known digital artifact 108). As such, the system may increase the number of vulnerabilities detected within a computing environment as well as ensure that the computing environment is more secure. Additionally, by combining internal and external data sources to identify vulnerabilities, generate corresponding risk scores, and rank them in a user interface, the system may improve the efficiency of security operations as time and resources spent manually inspecting the system or comparing the alerts to alerts in one or more external datasets can be spent elsewhere. Furthermore, the system may provide a more comprehensive and up-to-date security analysis for computing environments over traditional methods.

The system may be used to identify the number of times a vulnerability is observed in a computing environment by creating and updating a counter identifying instances of the vulnerability. In disclosed embodiments, a "counter" may include a count of the number of attempted exploits of a specific vulnerability. In some embodiments, the counter may comprise the number of successful exploits of a specific vulnerability. In some embodiments, the counter may comprise the number of observed occurrences within the computing environment of a specific vulnerability. In some embodiments, the counter may comprise a combination of observatory metrics for a specific vulnerability. The count may provide insight into which vulnerabilities are common across a computing environment or which vulnerabilities need to be patched. The count may also help the system eliminate vulnerabilities that do not need a patch as urgently as other vulnerabilities, such as in the case where a vulnerability only occurs one time in a specific unlikely scenario. For example, if the vulnerability is only able to be exploited with a specific user account.

The system may be used to identify the rate of frequency of a vulnerability. In disclosed embodiments, a "rate of frequency" may include a variable that stores the number of times the known vulnerability has been exploited over a period of time in a computing environment. In some embodiments, the rate of frequency may indicate a high-priority vulnerability, a trend in exploiting a vulnerability, or the effectiveness of applied patches. For example, the rate of frequency may indicate a high-priority vulnerability if there is an upward trend of attempted exploits for the vulnerability. As another example, the rate of frequency may indicate a trend in vulnerabilities that are being exploited in a computer system. If many exploit attempts are detected in a short duration, it may be indicative that a vulnerability is more likely to be successful or that a vulnerability is more likely to be exploited with repeated attempts (e.g., in brute force attacks). In another example, the rate of frequency may indicate the effectiveness of applied patches. All of these indicators that stem from the rate of frequency of exploited vulnerabilities can help to inform the system in generating a risk score and value for patching the vulnerability.

The system may be used to identify alerts in a computing environment. In disclosed embodiments, an "alert" may include an attempted exploitation of a vulnerability. For example, an alert may occur when an unauthorized actor attempts to gain access to a network or access a restricted file. In some embodiments, the alert may be delivered by an intrusion detection system (IDS) or an intrusion prevention system (IPS), which are designed to mitigate and transmit an alert to the system when vulnerabilities are exploited in the computing environment. In some embodiments, the alert may be delivered in a variety of ways including email notifications, text messages, phone calls, application notifications, or other forms of communication. In some embodiments, the alert may comprise additional information about the attempted exploitation of the vulnerability including the specific vulnerability that was detected, digital artifacts pertaining to the specific vulnerability that was detected, or known patches depending on if the vulnerability is known.

The system may be used to determine a known vulnerability. In disclosed embodiments, a "known vulnerability" may include a vulnerability that is identified and disclosed internally or externally. In some embodiments, the known vulnerability may comprise a vulnerability with a Common Vulnerabilities and Exposures ID (CVE ID). In some embodiments, the known vulnerability may comprise a public disclosure including the vulnerability, risk assessments, and known patches. In some embodiments, the known vulnerability may be stored in open databases and accessible by multiple parties. For example, a vulnerability in a networking component may be identified and disclosed publicly.

The system may be used to identify vulnerabilities within a computing environment. In disclosed embodiments, a "computing environment" may include the resources necessary to support the function of one or more networked computers. In some embodiments, the computing environment may comprise servers, user devices, networking hardware, storage devices, or software components. For example, in a small organization, the computing environment may be limited to one local office comprising a few components whereas, in a large organization, the computing environment may span a large geographical region and comprise many components.

The system may be used to identify a current digital artifact. In disclosed embodiments, a "current digital artifact" may include observable or measurable events within the computing environment indicative of a successful or attempted exploit of a vulnerability. In some embodiments, the current digital artifact may serve as proof, in the form of digital forensic evidence, of an attack on the system. The current digital artifact may be identified by the system after identifying an alert (e.g., a current alert). In some embodiments, the current digital artifact may include unfamiliar processes running on components in the computing environments, unauthorized access to restricted data, network usage anomalies, performance issues, or unexpected behavior. For example, the current digital artifact may be the presence of an unknown executable file. As another example, the current digital artifact could be the unexpected creation of a new user account on a system. Another example of the current digital artifact could be unauthorized access to a specific sensitive database.

The system may be used to confirm the identity of a vulnerability by comparing the current digital artifact to a known digital artifact. In disclosed embodiments, a "known digital artifact" may include observable or measurable events within a computing environment that are known to be indicative of an exploit of a vulnerability. In some embodiments, the known digital artifact may be stored in a publicly accessible database. In some embodiments, the known digital artifact may comprise digital forensic evidence that indicates a successful attack, information about specific ramifications of an attack, known steps taken to exploit the vulnerability, or other data pertaining to the known digital artifact.

The system may be used to run a vulnerability scanner to identify vulnerabilities in the computing environment. In disclosed embodiments, a "vulnerability scanner" may include different types of scanners such as network-based scanners (e.g., scanning for vulnerabilities in network infrastructures, such as routers and switches such as any unintentionally open ports or vulnerable services that may be running on those hosts), host-based scanners (e.g., scanning for vulnerabilities in a single host or device, such as a desktop computer, server, virtual machine or container such as any missing patches, misconfigurations or vulnerable services that may be running on that host), wireless scanners (e.g., scanning for vulnerabilities in wireless networks such as any exposed sensitive information or weak passwords), application scanners (e.g., scanning for vulnerabilities in web applications and websites, such as cross-site scripting (XSS) and SQL injection flaws), or database scanners (e.g., scanning for vulnerabilities in databases such as weak passwords or exposed sensitive data).

The system may be used to identify a publicly available risk score associated with a vulnerability. In disclosed embodiments, a "public risk score" may include a qualitative assessment from the CVSS, a combination of public risk scores, or an alternate risk score such as a score from the NVD. For example, a public risk score may be retrieved from an official government website or a vulnerability database. The public risk score may be an aggregate of scores gathered from sources including a government website or one or more vulnerability databases.

The system may be used to identify a risk score associated with a vulnerability or alert. In disclosed embodiments, a "risk score" may include one or more metrics identifying a vulnerability or alerts in a computing environment such as the rate of frequency of alerts or a count of alerts in addition to one or more public risk scores. In some embodiments, the risk score may comprise a rate of frequency (e.g., the number of times the known vulnerability has been exploited in the computing environment over a period of time). In some embodiments, the risk score may comprise a counter that tracks the number of times the known vulnerability has been exploited in the computing environment. In some embodiments, the risk score may be the known digital artifact and one or more public risk scores. For example, the system may aggregate data from multiple sources to form a risk score. These sources may include metrics from the CVSS or the NVD. Additionally, the sources used to generate a risk score may include a framework that assesses key factors (e.g., assessing damage potential, reproducibility, exploitability, number of affected users, or ramifications of exploitation). In some embodiments, the risk score may be determined in part or in whole by using a multivariable logistic regression model which is able to compute inferential statistics (which is useful for smaller datasets such as smaller computing environments) by determining the effects of a collection of predictor variables with different data types on a dichotomous (binary) outcome (e.g., the presence or absence of an alert).

The system may be used to receive proposed patches from users for a specific vulnerability associated with a current alert. In disclosed embodiments, a "proposed patch" may include a proposed solution to fix flaws in the computing environment caused by the current alert. In some embodiments, the proposed patch may comprise a piece of software that is designed to fix a vulnerability. In some embodiments, the proposed patch may be submitted by a user internally or externally. In some embodiments, the proposed patch may be submitted by a user in exchange for a monetary or non-monetary reward. In some embodiments, the proposed patch may be identified from an online source such as an article or a forum.

Figure 2:
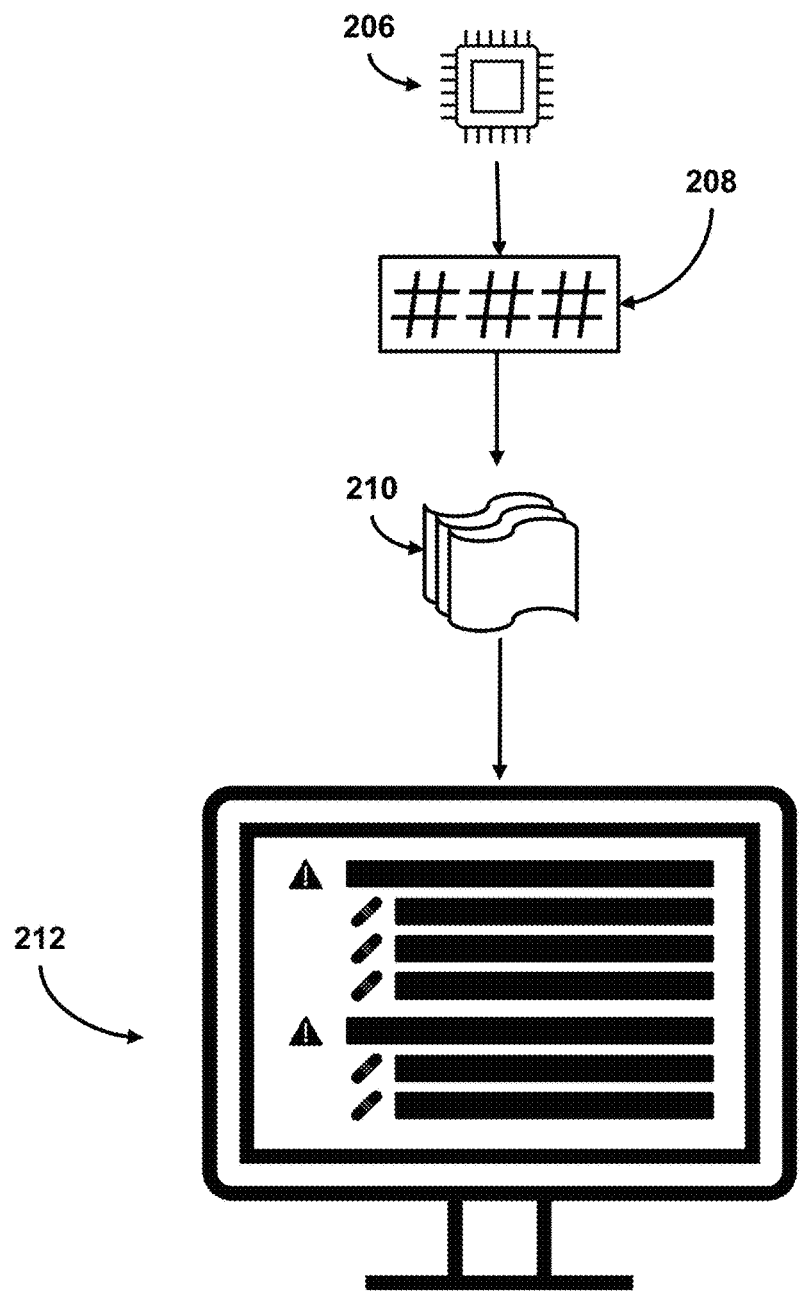
FIG. 2 shows an illustrative diagram for determining a risk score for the known vulnerability, wherein the risk score is based on the counter, the known digital artifact, and the public risk score, in accordance with one or more embodiments.

FIG. 2 shows an illustrative diagram for determining a risk score for the known vulnerability, wherein the risk score is based on the counter, the known digital artifact, and the public risk score, in accordance with one or more embodiments. System 200 may include model 206. Model 206 may receive current digital artifacts or known digital artifacts (e.g., current digital artifact 106, or known digital artifact 108). Model 206 may compare the current digital artifact to the known digital artifact to confirm the presence of a vulnerability in a computing environment. After confirming the presence of a vulnerability in the computing environment, model 206 may update an internal risk score (e.g., risk score 210) based on an internal metric such as a counter (e.g., counter 208).

After updating counter 208, the system may determine a risk score for the known vulnerability, such that the risk score is based on counter 208, the digital artifact (e.g., current digital artifact 106), the known digital artifact (e.g., known digital artifact 108) and one or more public risk scores. For example, the counter may be useful in determining the risk score. For example, if there are more instances of a vulnerability in a computing environment, there is a higher likelihood that a vulnerability is exploited successfully. The counter may also indicate how many systems are affected by the vulnerability.

In some embodiments, integrating counter 208 for the number of attempted exploits of a vulnerability is important in prioritizing vulnerabilities to patch or in conducting overall risk assessments. For example, by using counter 208 to track the count of a vulnerability within a computing environment, it is possible to prioritize which vulnerabilities of all the vulnerabilities detected within the computing environment should be patched first. By triaging vulnerabilities, the entity patching the vulnerabilities can conserve resources and be optimally efficient at securing the computing environment. As another example, by using counter 208 to track the count of a vulnerability within a computing environment, it is possible to improve the accuracy of impact assessments for a computing environment. Specifically, if counter 208 indicates a high number of attempted exploits for a vulnerability in the computing environment, the impact to the computing environment may be greater than if the counter indicates a low number of attempted exploits for a vulnerability.

After model 206 generates risk score 210 by leveraging information from counter 208, the system may use risk score 210, in addition to popularity metrics and proposed patches (e.g., proposed patches 116), to generate a user interface (e.g., user interface 212). User interface 212 may include vulnerabilities identified in a system arranged corresponding to the relative real-time risk of the vulnerability, associated patches, a vulnerability identification number to differentiate between vulnerabilities, a brief description of associated digital artifacts, a popularity metric, or additional metrics pertaining to the vulnerability. For example, a vulnerability that has a high-risk score relative to the computing environment would rank higher than a vulnerability that has a lower risk score, and subsequently the vulnerability with the higher risk score may appear above the vulnerability.

Figure 3:
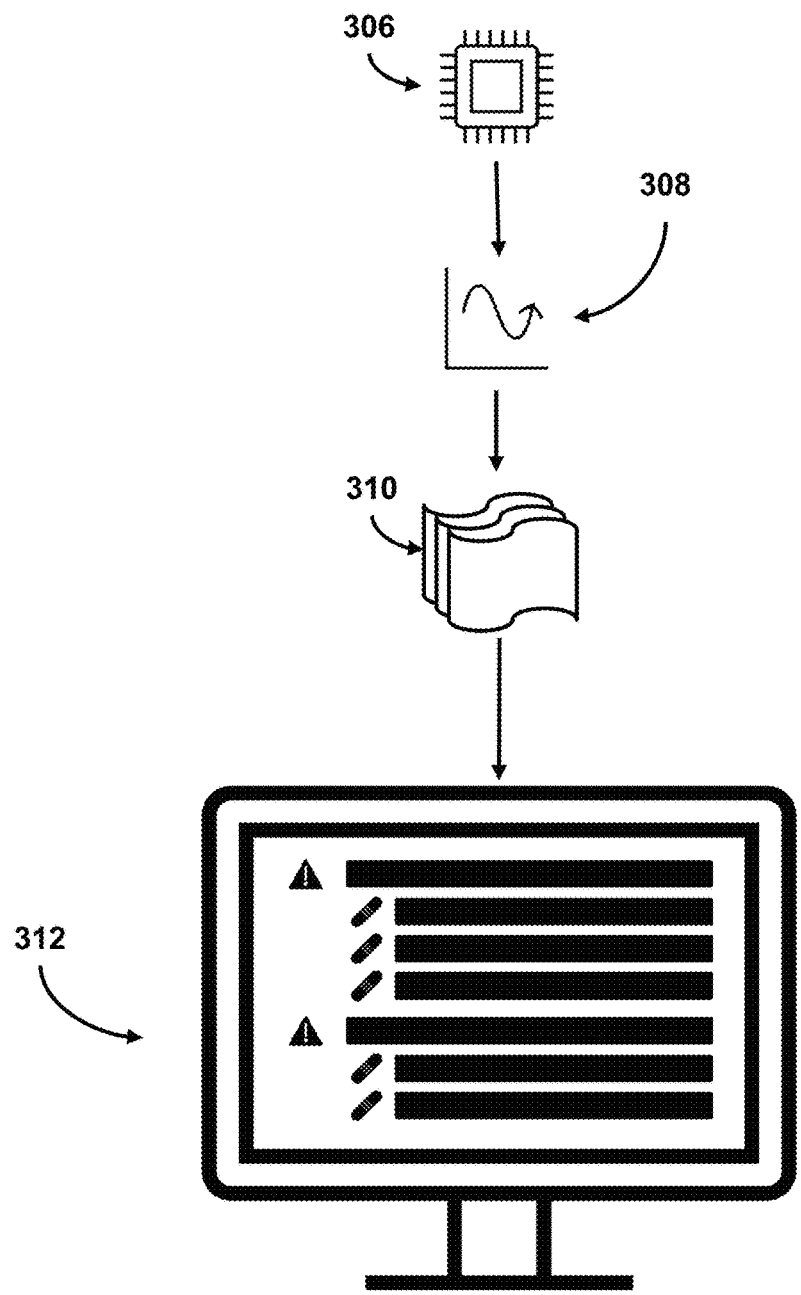
FIG. 3 shows an illustrative diagram for determining a risk score for the known vulnerability, wherein the risk score is based on the rate of frequency, the known digital artifact, and the public risk score, in accordance with one or more embodiments.

FIG. 3 shows an illustrative diagram for determining a risk score for the known vulnerability, wherein the risk score is based on the rate of frequency, the known digital artifact, and the public risk score, in accordance with one or more embodiments. System 300 may include model 306. Model 306 may receive current digital artifacts or known digital artifacts (e.g., current digital artifact 106, or known digital artifact 108). Model 306 may compare the current digital artifact to the known digital artifact to confirm the presence of a vulnerability in a computing environment. After confirming the presence of a vulnerability in the computing environment, model 306 may update an internal risk score (e.g., risk score 310) based on an internal metric such as a rate of frequency (e.g., rate of frequency 308).

The rate of frequency can be updated by defining a period of time to observe vulnerabilities in the computing environment and monitoring the computing environment for a duration of one or more of the periods of time to plot the changes in the number of vulnerabilities observed in the computing environment. For example, if the observation period is one day, the system may observe the computing environment for 3 days and keep track of the number of observed vulnerabilities in the computing system each day. If on day one, three vulnerabilities were observed, on day two, seven vulnerabilities were observed, and on day three, ten vulnerabilities were observed, the system may be able to extrapolate additional information to use in generating the risk score such as an upward trend in a specific vulnerability being indicative of a higher risk score for that vulnerability.

After updating frequency 308, the system may determine a risk score for the known vulnerability, such that the risk score is based on rate of frequency 308, the digital artifact (e.g., current digital artifact 106), the known digital artifact (e.g., known digital artifact 108), and one or more public risk scores. For example, the rate of frequency may be useful in determining the risk score because the rate of frequency may identify emerging threats to the computing environment, help identify the likelihood that an exploitation is attempted and prioritize vulnerabilities for patching based on the current needs of the computing environment.

In some embodiments, integrating rate of frequency 308 to track the rate of attempted exploits in prioritizing and contextualizing the importance of patching a vulnerability within a computing environment may help identify emerging threats to the computing environment, specifically if the rate of frequency indicates an upward trend of attempted exploits for a specific vulnerability, it may lead to the vulnerability having a higher risk score.

After model 306 generates risk score 310 by leveraging information from frequency 308, the system may use risk score 310 in addition to popularity metrics and proposed patches (e.g., proposed patches 116) to generate a user interface (e.g., user interface 312). User interface 312 may include vulnerabilities identified in a system arranged corresponding to the relative real-time risk of the vulnerability, associated patches, a vulnerability identification number to differentiate between vulnerabilities, a brief description of associated digital artifacts, a popularity metric, or additional metrics pertaining to the vulnerability. For example, a vulnerability that has a high-risk score relative to the computing environment would rank higher than a vulnerability that has a lower risk score, and subsequently, the vulnerability with the higher risk score may appear above the vulnerability.

Figure 4:
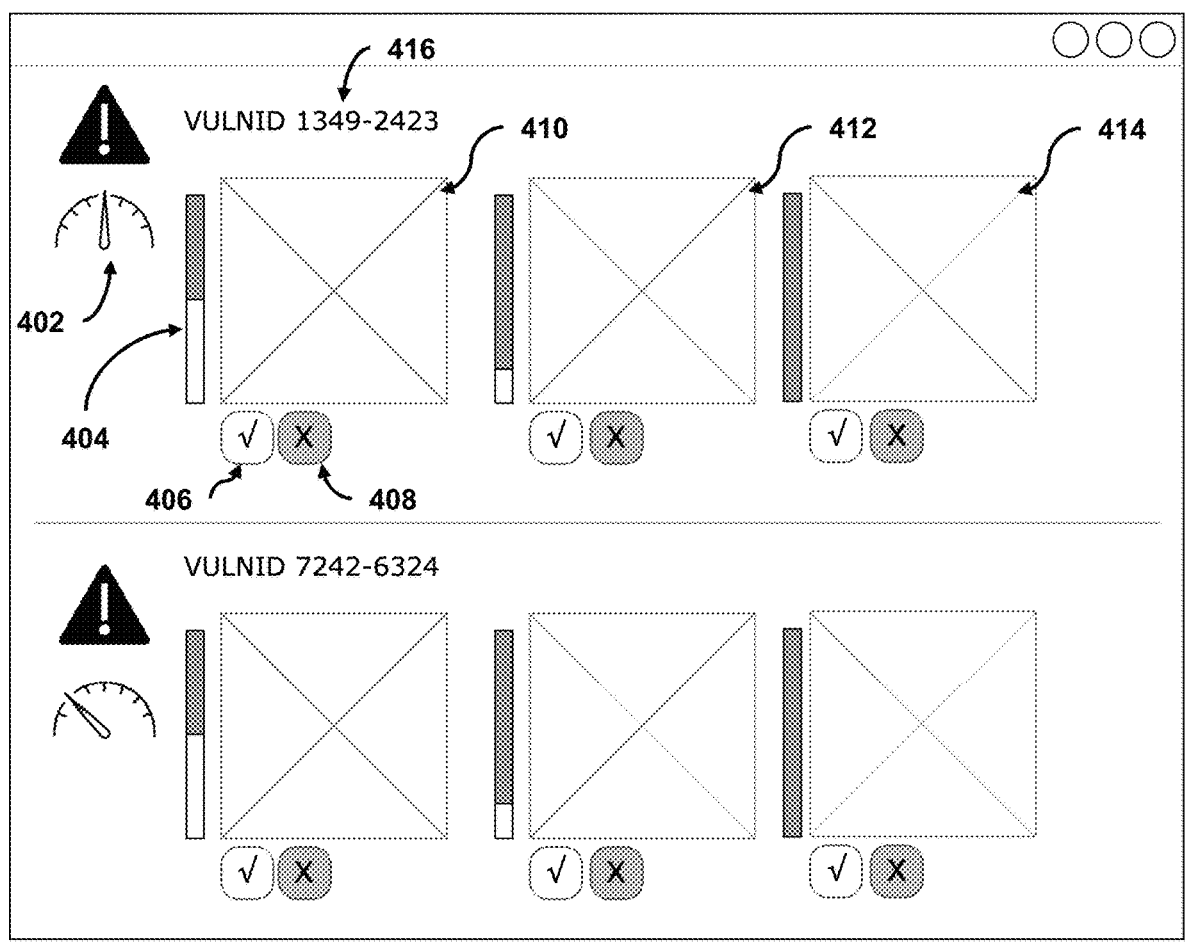
FIG. 4 shows an illustrative diagram of a user interface that includes a current alert and a plurality of proposed patches, in accordance with one or more embodiments.

FIG. 4 shows an illustrative diagram of a user interface that includes a current alert and a plurality of proposed patches, in accordance with one or more embodiments. User interface 400 may include a current alert and a plurality of proposed patches, in accordance with one or more embodiments. User interface 400 may include vulnerabilities identified within a computing environment arranged corresponding to the real-time risk of the vulnerability (e.g., risk score 402), associated patches (e.g., proposed patch 410, proposed patch 412, or proposed patch 414), a vulnerability identification number (e.g., vulnerability identification number 416) to differentiate between vulnerabilities, and a popularity metric (e.g., popularity metric 404). The popularity metric may be a dynamic metric influenced by user input. Specifically, the popularity metric may increase if a user selects positive feedback from button 406. Alternatively, the popularity metric may decrease if the user selects negative feedback from button 408.

Figure 5:
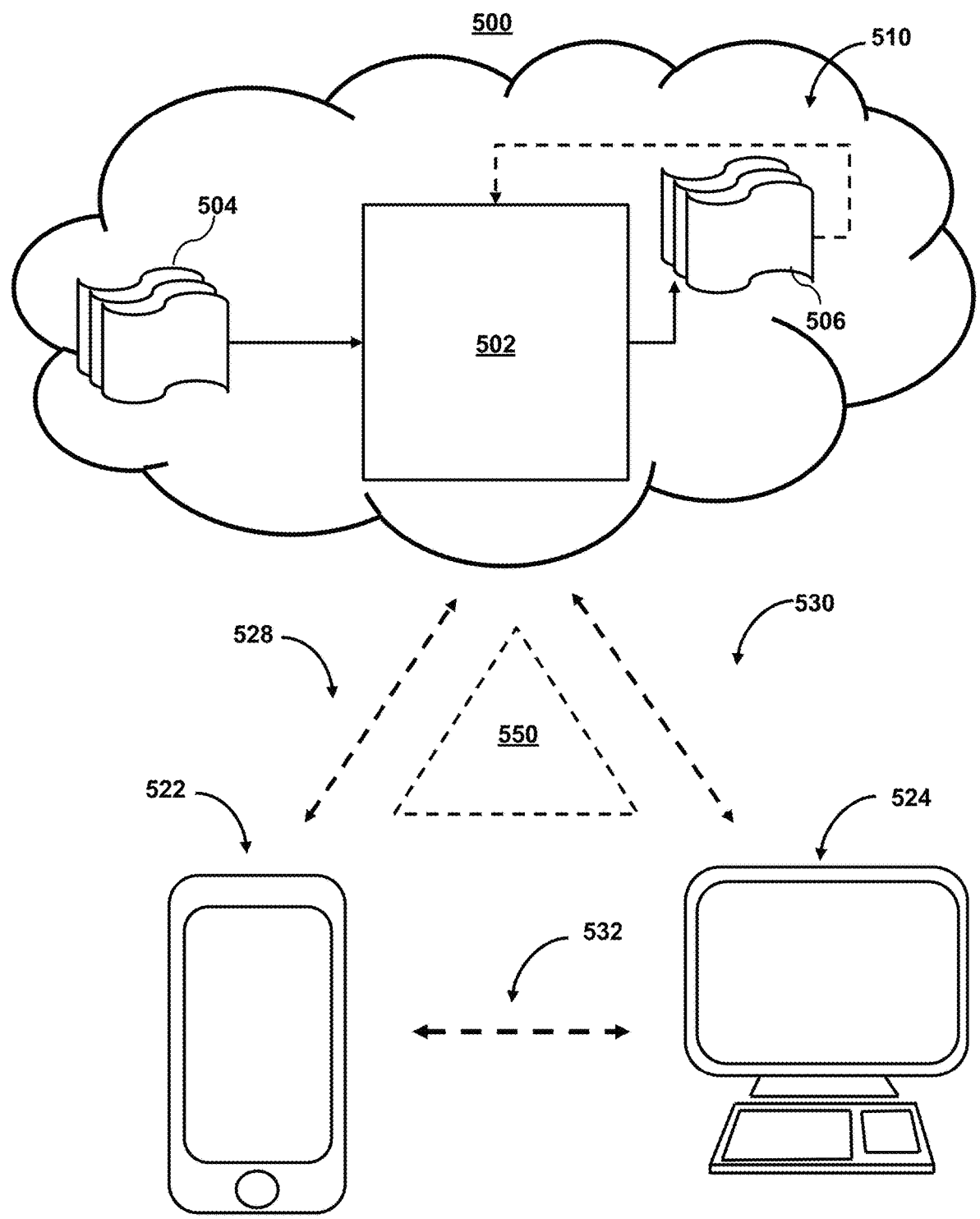
FIG. 5 shows illustrative components for a system used to determine the value of patching a vulnerability by aggregating data from various sources to generate a valuation metric based on the frequency a vulnerability is exploited in a computing environment or the number of times a vulnerability is observed in a computing environment, in accordance with one or more embodiments.

FIG. 5 shows illustrative components for a system used to determine the value of patching a vulnerability by aggregating data from various sources to generate a valuation metric based on the frequency a vulnerability is exploited in a computing environment or the number of times a vulnerability is observed in a computing environment, in accordance with one or more embodiments. For example, FIG. 5 may show illustrative components for generating a ranking of vulnerabilities based on the risk score and a corresponding compensation amount and for determining the value of patching a vulnerability within a computing environment. Generating a compensation amount may incentivize individuals to find patches for vulnerabilities and make estimating the value of patching a vulnerability within a computing environment more accurate. As shown in FIG. 5, system 500 may include mobile device 522 and user terminal 524. While shown as a smartphone and personal computer, respectively, in FIG. 5, it should be noted that mobile device 522 and user terminal 524 may be any computing device, including, but not limited to, a laptop computer, a tablet computer, a hand-held computer, and other computer equipment (e.g., a server), including "smart," wireless, wearable, and/or mobile devices. FIG. 5 also includes cloud components 510. Cloud components 510 may alternatively be any computing device as described above, and may include any type of mobile terminal, fixed terminal, or other device. For example, cloud components 510 may be implemented as a cloud computing system and may feature one or more component devices. It should also be noted that system 500 is not limited to three devices. Users may, for instance, utilize one or more devices to interact with one another, one or more servers, or other components of system 500. It should be noted, that, while one or more operations are described herein as being performed by particular components of system 500, these operations may, in some embodiments, be performed by other components of system 500. As an example, while one or more operations are described herein as being performed by components of mobile device 522, these operations may, in some embodiments, be performed by components of cloud components 510. In some embodiments, the various computers and systems described herein may include one or more computing devices that are programmed to perform the described functions. Additionally, or alternatively, multiple users may interact with system 500 and/or one or more components of system 500. For example, in one embodiment, a first user and a second user may interact with system 500 using two different components.

With respect to the components of mobile device 522, user terminal 524, and cloud components 510, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Each of these devices may also include a user input interface and/or user output interface (e.g., a display) for use in receiving and displaying data. For example, as shown in FIG. 5, both mobile device 522 and user terminal 524 include a display upon which to display data (e.g., conversational response, queries, and/or notifications).

Additionally, as mobile device 522 and user terminal 524 are shown as touchscreen smartphones, these displays also act as user input interfaces. It should be noted that in some embodiments, the devices may have neither user input interfaces nor displays, and may instead receive and display content using another device (e.g., a dedicated display device such as a computer screen, and/or a dedicated input device such as a remote control, mouse, voice input, etc.). Additionally, the devices in system 500 may run an application (or another suitable program). The application may cause the processors and/or control circuitry to perform operations related to generating dynamic conversational replies, queries, and/or notifications.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 5 also includes communication paths 528, 530, and 532. Communication paths 528, 530, and 532 may include the Internet, a mobile phone network, a mobile voice or data network (e.g., a 5G or LTE network), a cable network, a public switched telephone network, or other types of communications networks or combinations of communications networks. Communication paths 528, 530, and 532 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 510 may include one or more user devices within a computing environment (e.g., computing environment 102). Additionally, cloud components 510 may include external databases comprising vulnerability metrics and data (e.g., external database 110). Cloud components 510 may include current digital artifacts (e.g., current digital artifact 106) or known digital artifacts (e.g., known digital artifact 108).

Cloud components 510 may access external databases (e.g., external database 110) to query vulnerability metrics such as public risk score, a vulnerability identification number, a description of the vulnerability, expected digital artifacts. Cloud components 510 may also access a server (e.g., server 104) to assess metrics such as a counter that counts the number of successful exploits (e.g., counter 208) or a rate of frequency indicator indicating the number of attempted exploits over a period of time (e.g., rate of frequency 308).

Cloud components 510 may include model 502, which may be a machine learning model, artificial intelligence model, etc. (which may be referred collectively as "models" herein). Model 502 may take inputs 504 and provide outputs 506. The inputs may include multiple datasets, such as a training dataset and a test dataset. Each of the plurality of datasets (e.g., inputs 504) may include data subsets related to user data, predicted forecasts and/or errors, and/or actual forecasts and/or errors. In some embodiments, outputs 506 may be fed back to model 502 as input to train model 502 (e.g., alone or in conjunction with user indications of the accuracy of outputs 506, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction (e.g., a likelihood that a vulnerability detected in a computing environment is the same as a known vulnerability, or a metric indicating the damage to an entity if a vulnerability is exploited).

In a variety of embodiments, model 502 may update its configurations (e.g., weights, biases, or other parameters) based on the assessment of its prediction (e.g., outputs 506) and reference feedback information (e.g., user indication of accuracy, reference labels, or other information). In a variety of embodiments, where model 502 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 502 may be trained to generate better predictions.

In some embodiments, model 502 may include an artificial neural network. In such embodiments, model 502 may include an input layer and one or more hidden layers. Each neural unit of model 502 may be connected with many other neural units of model 502. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 502 may be self-learning and trained, rather than explicitly programmed, and can perform significantly better in certain areas of problem solving, as compared to traditional computer programs. During training, an output layer of model 502 may correspond to a classification of model 502, and an input known to correspond to that classification may be input into an input layer of model 502 during training. During testing, an input without a known classification may be input into the input layer, and a determined classification may be output.

In some embodiments, model 502 may include multiple layers (e.g., where a signal path traverses from front layers to back layers). In some embodiments, back propagation techniques may be utilized by model 502 where forward stimulation is used to reset weights on the "front" neural units. In some embodiments, stimulation and inhibition for model 502 may be more free-flowing, with connections interacting in a more chaotic and complex fashion. During testing, an output layer of model 502 may indicate whether or not a given input corresponds to a classification of model 502 (e.g., classifying vulnerabilities detected within the computing environment into known vulnerabilities, or classifying vulnerabilities detected within the computing environment into risk categories such as low, medium, or high risk).

In some embodiments, the model (e.g., model 502) may automatically perform actions based on outputs 506. In some embodiments, the model (e.g., model 502) may not perform any actions. The output of the model (e.g., model 502) may be used to calculate a risk score for a vulnerability observed in a computing environment (e.g., computing environment 102). The output may include a determination of a known vulnerability based on a current digital artifact (e.g., current digital artifact 106), a known digital artifact (e.g., known digital artifact 108) or a public risk score.

System 500 also includes API Layer 550. API Layer 550 may allow the system to generate summaries across different devices. In some embodiments, API Layer 550 may be implemented on mobile device 522 or user terminal 524. Alternatively or additionally, API Layer 550 may reside on one or more of cloud components 510. API Layer 550 (which may be A REST or Web services API layer) may provide a decoupled interface to data and/or functionality of one or more applications. API Layer 550 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions.

API Layer 550 may use various architectural arrangements. For example, system 500 may be partially based on API Layer 550, such that there is strong adoption of SOAP and RESTful Web-services, using resources like Service Repository and Developer Portal, but with low governance, standardization, and separation of concerns. Alternatively, system 500 may be fully based on API Layer 550, such that separation of concerns between layers like API Layer 550, services, and applications are in place.

In some embodiments, the system architecture may use a microservice approach. Such systems may use two types of layers: Front-End Layer and Back-End Layer where microservices reside. In this kind of architecture, the role of the API Layer 550 may provide integration between Front-End and Back-End. In such cases, API Layer 550 may use RESTful APIs (exposition to front-end or even communication between microservices). API Layer 550 may use AMQP (e.g., Kafka, RabbitMQ, etc.). API Layer 550 may use incipient usage of new communications protocols such as gRPC, Thrift, etc.

In some embodiments, the system architecture may use an open API approach. In such cases, API Layer 550 may use commercial or open-source API Platforms and their modules. API Layer 550 may use a developer portal. API Layer 550 may use strong security constraints applying WAF and DDoS protection, and API Layer 550 may use RESTful APIs as standard for external integration.

Figure 6:
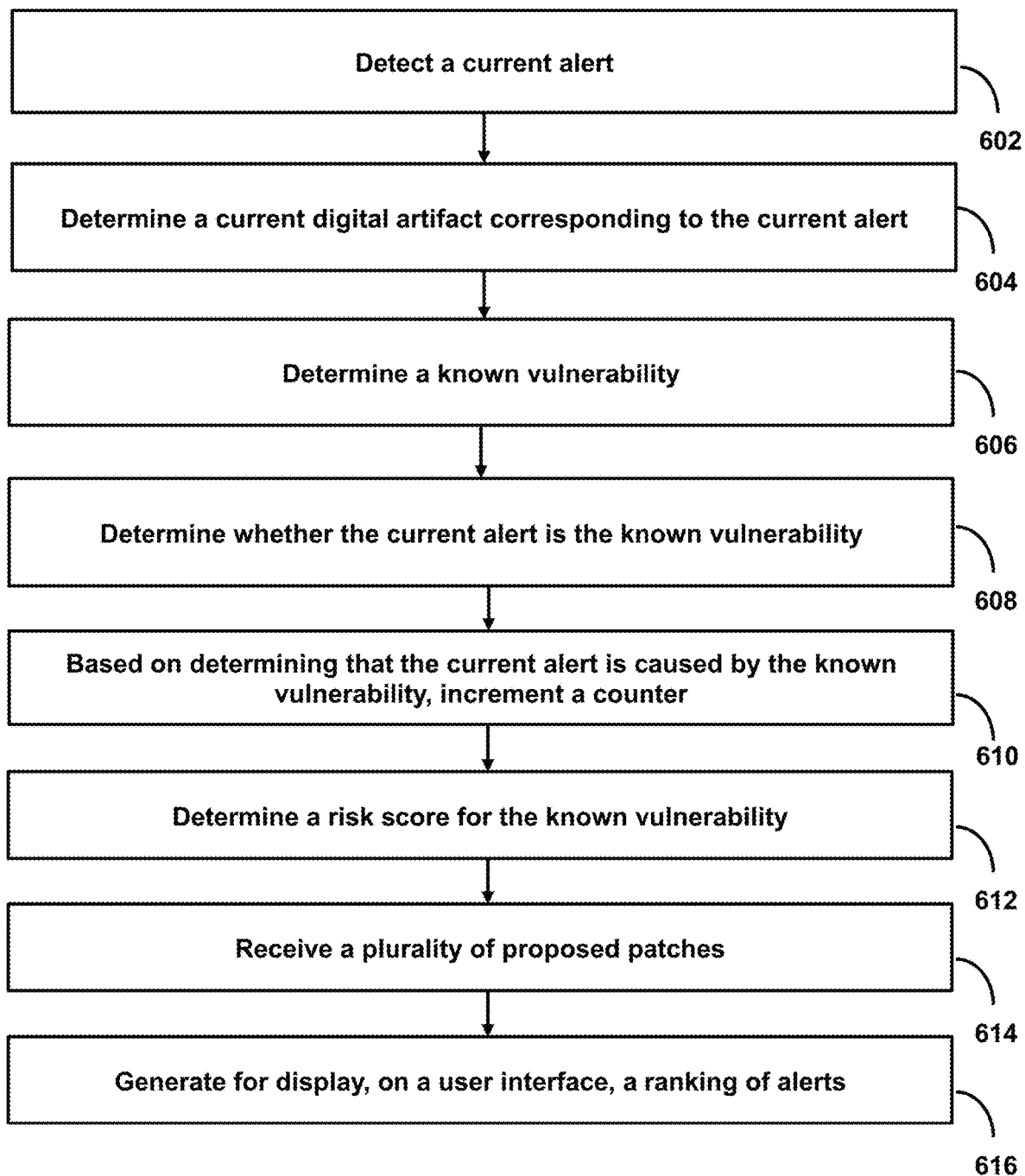
FIG. 6 shows a flowchart of the steps involved in determining the value of patching a vulnerability by aggregating data from various sources to generate a valuation metric based on the number of times a vulnerability is observed in a computing environment, in accordance with one or more embodiments.

FIG. 6 shows a flowchart of the steps involved in determining the value of patching a vulnerability by aggregating data from various sources to generate a valuation metric based on the number of times a vulnerability is observed in a computing environment, in accordance with one or more embodiments. For example, the system may use process 600 (e.g., as implemented on one or more system components described above) in order to generate a ranking of vulnerabilities based on the risk score and a corresponding bounty to incentivize individuals to find patches for vulnerabilities.

At step 602, process 600 (e.g., using one or more components described above) may detect a current alert. For example, the system may detect a current alert in a computing environment. For example, the system may notice unusual login activity for a user account. The login activity for the user account may be unusual because of the time of day, the duration of the login, or the location of the login. The abnormal login activity may be a current alert. By detecting a current alert in the computing environment, the system may react in real time to new threats discovered in a computing environment.

At step 604, process 600 (e.g., using one or more components described above) may determine a current digital artifact corresponding to the current alert. For example, the system, after identifying a current alert, may determine a current digital artifact corresponding to the current alert, wherein the current digital artifact comprises digital forensic evidence. For example, the system may identify a current alert indicating an anomalous login attempt. The system may then determine a current digital artifact such as an unexpected executable file in the system files that the user did not create. The current digital artifact may be indicative of a successfully exploited vulnerability in the computing environment. By determining a current digital artifact corresponding to the current alert, the system may be able to identify specific attributes that are indicative that the computing environment was compromised by an attacker, which is helpful in determining which vulnerabilities need to be patched.

In some embodiments, the system may receive an additional digital artifact, determine a vulnerability equivalence likelihood, update the risk score, and compare the vulnerability equivalence likelihood to a threshold likelihood. For example, the system may receive an additional digital artifact, wherein the additional digital artifact comprises additional information specific to the current alert, determine, based on the current digital artifact and the additional digital artifact, a vulnerability equivalence likelihood, wherein the vulnerability equivalence likelihood identifies how probable it is that the current alert is an instance of the known vulnerability, update the risk score based on the vulnerability equivalence likelihood, and compare the vulnerability equivalence likelihood to a threshold likelihood, wherein the threshold likelihood is a numeric value indicating a likelihood the vulnerability equivalence likelihood must meet or exceed before the current alert is manually reviewed. For example, the system may identify an alert that there is a change to system behavior (e.g., unusual files or unusual restarting) and identifies an unusual file in the system files as a first digital artifact. The system may receive a second digital artifact such as unusual login activity which is also characterized by a change in system behavior. The system may consider both the first digital artifact and the second digital artifact to determine the vulnerability equivalence likelihood indicating the probability that the current alert is an instance of the known vulnerability and update the risk score accordingly. Furthermore, the system may compare the vulnerability equivalence likelihood to a threshold likelihood indicative of the value that must be met prior to a manual review of the current alert. By determining a vulnerability equivalence likelihood, updating the risk score, and comparing the vulnerability equivalence likelihood to a threshold likelihood, the system may ensure that the resources allocated to manually reviewing alerts are optimized.

In some embodiments, the system may determine whether the plurality of known digital artifacts is equivalent to the digital artifacts from the plurality of digital artifacts. For example, the system may determine the threshold likelihood by determining a plurality of digital artifacts, wherein the plurality of digital artifacts comprises information specific to the current alert, retrieving a plurality of known digital artifacts, wherein the plurality of known digital artifacts comprises information specific to the known vulnerability, and generating the threshold likelihood based on how many digital artifacts from the plurality of digital artifacts and the plurality of known digital artifacts are equivalent. For example, the system may determine a plurality of digital artifacts from a third-party database comprising information specific to the current alert. The system may then retrieve the plurality of known digital artifacts specific to the known vulnerability. The system may compare the digital artifacts from the plurality of digital artifacts from the third-party database to the known digital artifacts to ensure they are equivalent. If the system determines the digital artifacts from the third-party database are equivalent to the known digital artifact the system may generate a threshold likelihood accordingly. For example, the threshold likelihood may be higher if there are more digital artifacts from the third-party database observed within the computing environment. By determining whether the plurality of known digital artifacts is equivalent to the digital artifacts from the plurality of digital artifacts, the system may ensure the threshold likelihood is more accurate, thereby ensuring that the manual review does not include unnecessary current alerts.

At step 606, process 600 (e.g., using one or more components described above) may determine a known vulnerability. For example, the system may determine a known vulnerability, wherein the known vulnerability comprises a known digital artifact and a public risk score. For example, the system may determine that an alert corresponds to a known vulnerability. The system may identify the known vulnerability as well as corresponding known digital artifacts and one or more public risk scores. For example, if a hospital suffers a ransomware attack, it may be possible for the system to receive an alert and identify one or more digital artifacts associated with the ransomware attack. After comparing the one or more digital artifacts associated with the ransomware attack to the known vulnerability, the system may determine that the ransomware attack the hospital suffered is a result of a known vulnerability. The system may also provide additional known digital artifacts to increase the confidence in the vulnerability equivalence likelihood, as well as obtain public risk scores associated with the known vulnerability. By determining a known vulnerability, the system may be able to gather additional information about the known vulnerability from multiple sources and use the additional information in conjunction with the counter or the rate of frequency to establish a more relevant and useful risk score for the vulnerability.

At step 608, process 600 (e.g., using one or more components described above) may determine whether the current alert is the known vulnerability. For example, the system may determine whether the current alert is the known vulnerability by comparing the current digital artifact to the known digital artifact. For example, if a current alert is a new file that is installed on a computer in a computing environment, the system may identify a current digital artifact as the hash of the new file and compare the hash of the new file with hashes of known pieces of malware. Based on if the hashes match, the system may be able to identify the type of malware installed via the vulnerability in the computer in the computing environment. By determining whether the current alert is the known vulnerability, the system may be able to accurately determine an accurate risk score in conjunction with a counter or a rate of frequency for use in ranking vulnerabilities within a computing environment.

In some embodiments, the system may determine whether the plurality of known digital artifacts is equivalent to the digital artifacts from the plurality of digital artifacts. For example, the system may determine the threshold likelihood by determining a plurality of digital artifacts, wherein the plurality of digital artifacts comprises information specific to the current alert, retrieving a plurality of known digital artifacts, wherein the plurality of known digital artifacts comprises information specific to the known vulnerability, and generating the threshold likelihood based on how many digital artifacts from the plurality of digital artifacts and the plurality of known digital artifacts are equivalent. For example, the system may determine a plurality of digital artifacts from a third-party database comprising information specific to the current alert. The system may then retrieve the plurality of known digital artifacts specific to the known vulnerability. The system may compare the digital artifacts from the plurality of digital artifacts from the third-party database to the known digital artifacts to ensure they are equivalent. If the system determines the digital artifacts from the third-party database are equivalent to the known digital artifact, the system may generate a threshold likelihood accordingly. For example, the threshold likelihood may be higher if there are more digital artifacts from the third-party database observed within the computing environment. By determining whether the plurality of known digital artifacts is equivalent to the digital artifacts from the plurality of digital artifacts, the system may ensure the threshold likelihood is more accurate, thereby ensuring that the manual review does not include unnecessary current alerts.

In some embodiments, the system may use geographic data from a network log to determine the current digital artifact corresponding to the current alert. For example, the system may determine the current digital artifact corresponding to the current alert by retrieving a network log corresponding to a time period of the current alert, querying the network log for geographical data corresponding to the current digital artifact, detecting a geographical region corresponding to the current digital artifact during the time period of the current alert, and comparing the geographical region corresponding to the current digital artifact to the geographical region of the known digital artifact. For example, the current digital artifact may be an internet protocol address (IP address). The system may extrapolate location data, such as a specific city, from the IP address. The system may compare the extrapolated location data from the current digital artifact to geographic data associated with a known digital artifact. The system may find that the extrapolated location data from the current digital artifact is equivalent to the geographic data associated with the known digital artifact, thereby increasing the likelihood that the current alert associated with the current digital artifact corresponds to the known digital artifact. By determining that the current digital artifact corresponding to the current alert comprises geographical data corresponding to a known digital artifact, the system may increase the likelihood that the current alert associated with the current digital artifact corresponds to the known digital artifact thereby ensuring the information pertaining to the known digital artifact is applicable to the current digital artifact and subsequently, the current alert.

In some embodiments, the system may determine that the current digital artifact corresponding to the current alert comprises abnormal user events corresponding to a known digital artifact. For example, the system may determine the current digital artifact corresponding to the current alert by retrieving a user activity log corresponding to a time period of the current alert, querying the user activity log for abnormal user events corresponding to the current digital artifact, detecting an abnormality corresponding to the current digital artifact during the time period of the current alert, wherein the abnormality comprises behavior in the computing environment deviates from a baseline, and wherein the baseline comprises standard operations in the computing environment, and compare the abnormality corresponding to the current digital artifact to the abnormality of the known digital artifact. For example, the system may retrieve user activity for a computing environment such as a bank. The bank may have databases with employee records, accessible only by users that are part of the human resources group. A user outside the human resources group may have attempted to access the restricted database. The current digital artifact may include attempting to access the restricted database as an unauthorized user. This may be an abnormal activity within the computing environment. By identifying the abnormal activity within the computing environment, the system may compare the abnormal activity to known digital artifacts to determine the likelihood that the current digital artifact corresponds to a known digital artifact. By determining that the current digital artifact corresponding to the current alert comprises abnormal user events corresponding to a known digital artifact, the system may identify and remediate vulnerabilities in the system that are associated with anomalous or abnormal user behavior or activity within a computing environment. (e.g., logging in at unusual hours, accessing digital assets from an abnormal location, attempting to access a restricted file or folder, attempting to gain unauthorized access to a physical system such as a server or network router).

In some embodiments, the system may retrieve a network log and analyze the network log for routing data corresponding to the current alert. For example, the system may determine the current digital artifact corresponding to the current alert by retrieving a network log corresponding to a time period of the current alert, querying the network log for routing data corresponding to the current digital artifact, detecting a route corresponding to the current digital artifact during the time period of the current alert, and comparing the route corresponding to the current digital artifact to the route of the known digital artifact. For example, the system may determine the current digital artifact corresponding to the current alert by querying the network log for routing data associated with a known digital artifact. For example, if the current alert comprises routing data, such as a packet traversing from server one to server two, the system may query network logs associated with the computing environment and identify a known digital artifact comprising the same routing data. By retrieving a network log and analyzing the network log for routing data corresponding to the current alert, the system may be able to obtain additional data pertaining to the current alert which may help to efficiently find a patch.

In some embodiments, the system may determine the current digital artifact by comparing incoming network data corresponding to the current digital artifact to the incoming data of the known digital artifact. For example, the system may determine the current digital artifact corresponding to the current alert by retrieving a network log corresponding to a time period of the current alert, querying the network log for incoming data corresponding to the current digital artifact, detecting the incoming data corresponding to the current digital artifact during the time period of the current alert, and comparing the incoming data corresponding to the current digital artifact to the incoming data of the known digital artifact. For example, network logs corresponding to the known digital artifact may include traffic coming from an IP address originating from a specific city. If the network logs indicate network traffic associated with the current digital artifact coming from the IP address originating from the specific city, the system may compare the network log information for the known digital artifact to the network log information corresponding to the current digital artifact. By determining the current digital artifact by comparing incoming network data corresponding to the current digital artifact to the incoming data of the known digital artifact, the system may identify a known vulnerability based on attributes, including network traffic. Including analysis of network logs as a means to identify a known vulnerability increases the likelihood the system may match the current vulnerability to a known vulnerability, which may lead to an increased chance that a viable patch can be applied to secure the computing environment.

At step 610, process 600 (e.g., using one or more components described above) may, based on determining that the current alert is caused by the known vulnerability, increment a counter. For example, the system may, based on determining that the current alert is caused by the known vulnerability, increment a counter, wherein the counter corresponds to a number of times the known vulnerability has been exploited in the computing environment. For example, after the system determines that the current alert is caused by a known vulnerability, the system may increment a counter, as the known vulnerability may have been successfully exploited within the computing environment. The counter may indicate the number of times the known vulnerability has been exploited within a computing environment regardless of the time period. For example, a current alert may be detected comprising one or more digital artifacts corresponding to an instance of the WannaCry ransomware. Known digital artifacts associated with the WannaCry ransomware may include strings associated with the WannaCry ransomware (e.g., creating a new file such as "b.wnry" or "@WanaDecryptor@.exe," changing the wallpaper to "@WanaDecryptor@.bmp" or creating registry keys). The current alert may comprise one or more of the known digital artifacts associated with the WannaCry ransomware. By incrementing a counter, the system may be able to generate a more accurate and holistic vulnerability risk score that can consider the count of successful exploits within a computing environment. Considering the count of successful exploits within a computing environment may lead to a faster response time for high incidences of a known vulnerability. Considering the count may also ensure that vulnerabilities that are widespread or common within a computing environment are addressed. By considering the count of successful exploits, the system may also ensure that vulnerabilities that are regularly exploited are patched more urgently than vulnerabilities with fewer successful exploits. Considering the count of successful exploits may also lead to vulnerabilities with less severe impacts being addressed if they are successfully exploited in large enough quantities (e.g., a minor disruption multiple times leads to a larger disruption over time).

At step 612, process 600 (e.g., using one or more components described above) may determine a risk score for the known vulnerability by leveraging the count of successful exploits. For example, the system may determine a risk score for the known vulnerability, wherein the risk score is based on the counter, the known digital artifact, and the public risk score. For example, the system may determine a risk score for the WannaCry ransomware based on the number of systems within a computing environment that have been infected with the ransomware. The risk score determined by the system may comprise the counter which indicates the number of instances of the WannaCry ransomware within a computing environment, the know digital artifacts associated with the WannaCry ransomware, and the public risk score associated with the WannaCry ransomware (e.g., NVD assigns a qualitative severity rating of HIGH to the WannaCry ransomware). By determining a risk score for the known vulnerability, the system may be able to accurately assess the severity of allowing a vulnerability to go unpatched. Additionally, by determining a risk score for the known vulnerability by leveraging the count of successful exploits, the system may be able to generate a ranking of observed known vulnerabilities to ensure that resources dedicated to securing a computing environment are efficiently allocated. The system may also be able to identify vulnerabilities that are or have been exploited multiple times. The system may be able to use the count of successful exploits to rank vulnerabilities within a computing environment since the computing environment was created. By ranking the vulnerabilities based on the counter, the system may be able to identify remediation efforts that were effective. By ranking the vulnerabilities based on the counter, the system may also ensure that vulnerabilities that are regularly exploited are patched more urgently than vulnerabilities with fewer successful exploits.

At step 614, process 600 (e.g., using one or more components described above) may receive a plurality of proposed patches. For example, the system may receive a plurality of proposed patches, wherein at least a portion of the plurality of proposed patches fixes flaws in the computing environment. For example, the system may receive patches from security professionals through a portal. For example, the system may receive patches from online sources such as forums, security organizations, news organizations, or blog posts. For example, the system may receive patches by using a web scraper to identify keywords pertaining to a known vulnerability or identification numbers associated with the known vulnerability. By receiving a plurality of proposed patches, the system may be able to secure the environment by quickly finding patches that may fix the security vulnerability posed by the known vulnerability. Having a large number of patches from one or more sources may increase the likelihood that a proposed patch can be applied to the computing environment to fix the vulnerability.

At step 616, process 600 (e.g., using one or more components described above) may generate for display, on a user interface, a ranking of alerts. For example, the system may generate for display, on a user interface, a ranking of alerts, wherein the ranking of alerts comprises the current alert and the plurality of proposed patches, wherein the current alert is sorted by the risk score, wherein the plurality of proposed patches is sorted by a popularity metric, and wherein the popularity metric describes community support for each proposed patch in the plurality of proposed patches. For example, the system may be used in a security operations center (SOC). A member of the SOC (e.g., a SOC analyst) may use the user interface, ranking the alerts detected in the computing environment to triage alerts. For example, a SOC analyst may address the first alert in a ranking of alerts based on the high-risk score and a high number of proposed patches. In addressing the first alert, the SOC analyst may assess the highest popularity proposed patch and the second highest popularity proposed patch to ascertain the effectiveness of both solutions to patch the vulnerability in the computing environment. Based on the manual assessment, the SOC analyst may choose the first proposed patch to implement within the computing environment. By generating for display, on a user interface, a ranking of alerts, the system may provide a high-level overview of the security of a computing environment and a clear ranking of detected alerts and associated patches, leading to a more secure computing environment and a clearer hierarchy of importance when addressing the alerts.

In some embodiments, the system may determine a selected patch after a period of time elapses for manual review. For example, the system may generate for the display, on the user interface, the ranking of alerts by determining a selected patch, wherein the selected patch is based on the popularity metric, wherein the popularity metric is determined after a period of time elapses, and wherein the period of time is determined based on the risk score and transmitting the selected patch for manual review, wherein the manual review comprises ensuring that the selected patch fixes vulnerabilities in the computing environment posed by the current alert. For example, the system may generate a user interface for use in a SOC and be accessible by members of a group (e.g., security analysts, a team at an organization, or another group of individuals sharing one or more attributes). The user interface may comprise a ranking of alerts and a popularity metric such that the popularity metric is determined based on input from members of the group for a specific period of time corresponding to the risk score. For example, the user interface may comprise the ranking of alerts and the popularity metric based on input from members of the group over a period of 5 days, if the alert has a high-risk score. After the 5 days elapse, the system may transmit a selected patch (e.g., the highest popularity patch) to a SOC analyst for manual review. The SOC analyst may ensure that the system-selected patch fixes the vulnerability or vulnerabilities posed by the current alert. By determining a selected patch after a period of time elapses for manual review, the system may efficiently address alerts in the computing environment, leading to a more secure computing environment.

In some embodiments, the system may determine a compensation amount for a selected patch. For example, the system may generate for the display, on the user interface, the ranking of alerts by determining a compensation amount for a selected patch, wherein the compensation amount corresponds to the risk score of the current alert, and wherein the selected patch corresponds to the popularity metric for a proposed patch in the plurality of proposed patches, transmitting the selected patch for manual review, wherein the manual review comprises ensuring that the selected patch fixes vulnerabilities in the computing environment posed by the current alert, and transmitting the compensation amount to an account associated with the selected patch. For example, the system may determine a compensation amount for a selected patch corresponding to the risk score assigned to the current alert and the popularity metric, transmit the patch for review, and transmit the compensation amount to an account associated with the selected patch. For example, the system may determine that a patch for a current alert is worth 1000 USD based on the risk score assigned to the current alert and the popularity metric. If a user proposes a patch that is very popular, the system may use the patch as the selected patch and transmit the selected patch for manual review (e.g., manual review by a SOC analyst). If the SOC analyst approves the patch for the current alert, and applies the patch to the computing environment, the system may transmit 1000 USD to the user account associated with the selected patch. By determining a compensation amount for a selected patch, the system may incentivize patches to be submitted to the system and gamify the vulnerability patching process, thereby encouraging more users to participate in the process, and increasing the likelihood that alerts are dealt with swiftly and accurately.

In some embodiments, the system may determine the compensation amount by using a response time metric and an efficiency metric. For example, the system may determine the compensation amount by determining a response time metric and an efficiency metric, wherein the response time metric describes an amount of time before the selected patch was submitted and when the current alert was observed in the computing environment, and wherein the efficiency metric describes changes that occur in the computing environment, which result in slower operations after applying the selected patch, and determining the compensation amount for the selected patch, wherein the compensation amount further comprises the response time metric and the efficiency metric. For example, the system may receive a patch from a user within 3 days of identifying the current alert. The patch from the user may improve the efficiency of a computing environment by 0.5%. As such, the system may determine the compensation amount based on the 3 days elapsed and the 0.5% increase in efficiency. By determining the compensation amount by using a response time metric and an efficiency metric, the system may incentivize participants to respond quickly and provide patches that do not degrade the performance of devices or operations within the computing environment when a current alert is detected. This may be helpful in instances when the current alert has a high-risk score and a quick response time is critical to reducing the damages caused by the vulnerability.

It is contemplated that the steps or descriptions of FIG. 6 may be used with any other embodiment of this disclosure. In addition, the steps and descriptions described in relation to FIG. 6 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 6.

Figure 7:
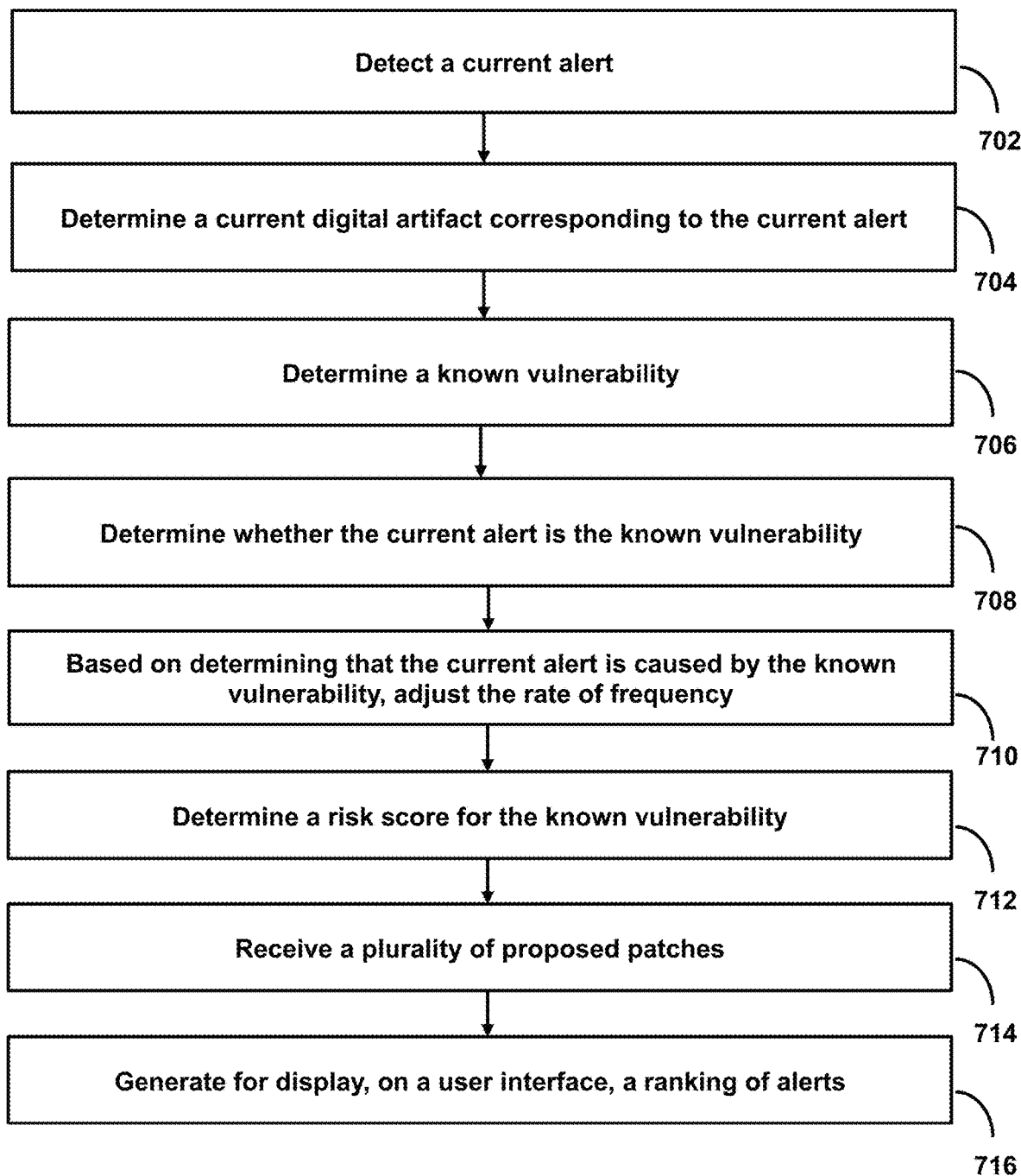
FIG. 7 shows a flowchart of the steps involved in determining the value of patching a vulnerability by aggregating data from various sources to generate a valuation metric based on the frequency a vulnerability is exploited in a computing environment, in accordance with one or more embodiments.

FIG. 7 shows a flowchart of the steps involved in determining the value of patching a vulnerability by aggregating data from various sources to generate a valuation metric based on the frequency a vulnerability is exploited in a computing environment, in accordance with one or more embodiments. For example, the system may use process 700 (e.g., as implemented on one or more system components described above) in order to determine the value of patching a vulnerability within a specific computing environment.

At step 702, process 700 (e.g., using one or more components described above) may detect a current alert. For example, the system may detect a current alert in a computing environment. For example, the system may notice unusual login activity for a user account. The login activity for the user account may be unusual because of the time of day, the duration of the login, or the location of the login. The abnormal login activity may be a current alert. By detecting a current alert in the computing environment, the system may react in real time to new threats discovered in a computing environment.

At step 704, process 700 (e.g., using one or more components described above) may determine a current digital artifact corresponding to the current alert. For example, the system, after identifying a current alert, may determine a current digital artifact corresponding to the current alert, wherein the current digital artifact comprises digital forensic evidence. For example, the system may identify a current alert indicating an anomalous login attempt. The system may then determine a current digital artifact such as an unexpected executable file in the system files that the user did not create. The current digital artifact may be indicative of a successfully exploited vulnerability in the computing environment. By determining a current digital artifact corresponding to the current alert, the system may be able to identify specific attributes that are indicative that the computing environment was compromised by an attacker, which is helpful in determining which vulnerabilities need to be patched.

In some embodiments, the system may compare the vulnerability equivalence likelihood and the threshold likelihood to determine if the current alert should be manually reviewed. For example, the system receives an additional digital artifact, wherein the additional digital artifact comprises additional information specific to the current alert, determines based on the current digital artifact and the additional digital artifact, a vulnerability equivalence likelihood, wherein the vulnerability equivalence likelihood identifies how probable it is that the current alert is an instance of the known vulnerability, updates the risk score based on the vulnerability equivalence likelihood, and compares the vulnerability equivalence likelihood to a threshold likelihood, wherein the threshold likelihood is a numeric value indicating a likelihood the vulnerability equivalence likelihood must meet or exceed before the current alert is manually reviewed. For example, the system may determine that the vulnerability equivalence likelihood is 70% as the current alert shares three digital artifacts with the known alert. By comparing the vulnerability equivalence likelihood and the threshold likelihood to determine if the current alert should be manually reviewed, the system may ensure an optimal allocation of resources dedicated to remediating current alerts.

In some embodiments, the system may generate the threshold likelihood based on how many digital artifacts and known digital artifacts are equivalent. For example, the system may determine the threshold by determining a plurality of digital artifacts, wherein the plurality of digital artifacts comprises information specific to the current alert, retrieving a plurality of known digital artifacts, wherein the plurality of known digital artifacts comprises information specific to the known vulnerability, and generating the threshold likelihood based on how many digital artifacts from the plurality of digital artifacts and the plurality of known digital artifacts are equivalent. For example, the system may generate a higher threshold likelihood if more digital artifacts overlap with the known digital artifacts. Subsequently, the system may generate a lower threshold likelihood if fewer digital artifacts overlap with the known digital artifact. By generating the threshold likelihood based on how many digital artifacts and known digital artifacts are equivalent, the system may accurately assess which of the current alerts need to be manually reviewed by paying specific attention to the number of digital artifacts that overlap between the current alert and a known vulnerability.

In some embodiments, the system may determine the current digital artifact based on comparing a port corresponding to the current digital artifact to the port associated with the known digital artifact. For example, the system may determine the current digital artifact corresponding to the current alert by retrieving a network log corresponding to a time period of the current alert, querying the network log for ports corresponding to the current digital artifact, detecting a port corresponding to the current digital artifact that was used during the time period of the current alert, and comparing the port corresponding to the current digital artifact to the port associated with the known digital artifact. For example, the system may retrieve network log data from various network hardware components (e.g., routers, switches, firewalls, or access points). The system may detect a port corresponding to the current digital artifact such as the port for telnet, port 23, that is not usually active but was active at the time period of the current alert. The system may compare the port detected, port 23, to the known digital artifact which may indicate that port 23 is indicative of a known vulnerability. By determining the current digital artifact based on comparing a port corresponding to the current digital artifact to the port associated with the known digital artifact, the system may be able to identify a known vulnerability more quickly within a computing environment based on network log data which may increase the chance a patch for the vulnerability is found and applied.

In some embodiments, the system may use geographic data from a network log to determine the current digital artifact corresponding to the current alert. For example, the system may determine the current digital artifact corresponding to the current alert by retrieving a network log corresponding to a time period of the current alert, querying the network log for geographical data corresponding to the current digital artifact, detecting a geographical region corresponding to the current digital artifact during the time period of the current alert, and comparing the geographical region corresponding to the current digital artifact to the geographical region of the known digital artifact. For example, the current digital artifact may be an IP address. The system may extrapolate location data, such as a specific city, from the IP address. The system may compare the extrapolated location data from the current digital artifact to geographic data associated with a known digital artifact. The system may find that the extrapolated location data from the current digital artifact is equivalent to the geographic data associated with the known digital artifact, thereby increasing the likelihood that the current alert associated with the current digital artifact corresponds to the known digital artifact. By determining that the current digital artifact corresponding to the current alert comprises geographical data corresponding to a known digital artifact, the system may increase the likelihood that the current alert associated with the current digital artifact corresponds to the known digital artifact thereby ensuring the information pertaining to the known digital artifact is applicable to the current digital artifact and subsequently the current alert.

In some embodiments, the system may determine that the current digital artifact corresponding to the current alert comprises abnormal user events corresponding to a known digital artifact. For example, the system may determine the current digital artifact corresponding to the current alert by retrieving a user activity log corresponding to a time period of the current alert, querying the user activity log for abnormal user events corresponding to the current digital artifact, detecting an abnormality corresponding to the current digital artifact during the time period of the current alert, wherein the abnormality comprises behavior in the computing environment deviates from a baseline, and wherein the baseline comprises standard operations in the computing environment, and compare the abnormality corresponding to the current digital artifact to the abnormality of the known digital artifact. For example, the system may retrieve user activity for a computing environment such as a bank. The bank may have databases with employee records, accessible only by users that are part of the human resources group. A user outside the human resources group may have attempted to access the restricted database. The current digital artifact may include attempting to access the restricted database as an unauthorized user. This may be an abnormal activity within the computing environment. By identifying the abnormal activity within the computing environment, the system may compare the abnormal activity to known digital artifacts to determine the likelihood that the current digital artifact corresponds to a known digital artifact. By determining that the current digital artifact corresponding to the current alert comprises abnormal user events corresponding to a known digital artifact, the system may identify and remediate vulnerabilities in the system that are associated with anomalous or abnormal user behavior or activity within a computing environment. (e.g., logging in at unusual hours, accessing digital assets from an abnormal location, attempting to access a restricted file or folder, attempting to gain unauthorized access to a physical system such as a server or network router).

In some embodiments, the system may retrieve a network log and analyze the network log for routing data corresponding to the current alert. For example, the system may determine the current digital artifact corresponding to the current alert by retrieving a network log corresponding to a time period of the current alert, querying the network log for routing data corresponding to the current digital artifact, detecting a route corresponding to the current digital artifact during the time period of the current alert, and comparing the route corresponding to the current digital artifact to the route of the known digital artifact. For example, the system may determine the current digital artifact corresponding to the current alert by querying the network log for routing data associated with a known digital artifact. For example, if the current alert comprises routing data, such as a packet traversing from server one to server two, the system may query network logs associated with the computing environment and identify a known digital artifact comprising the same routing data. By retrieving a network log and analyzing the network log for routing data corresponding to the current alert, the system may be able to obtain additional data pertaining to the current alert which may help with efficiently finding a patch.

In some embodiments, the system may determine the current digital artifact by comparing incoming network data corresponding to the current digital artifact to the incoming data of the known digital artifact. For example, the system may determine the current digital artifact corresponding to the current alert by retrieving a network log corresponding to a time period of the current alert, querying the network log for incoming data corresponding to the current digital artifact, detecting the incoming data corresponding to the current digital artifact during the time period of the current alert, and comparing the incoming data corresponding to the current digital artifact to the incoming data of the known digital artifact. For example, network logs corresponding to the known digital artifact may include traffic coming from an IP address originating from a specific city. If the network logs indicate network traffic associated with the current digital artifact coming from the IP address originating from the specific city, the system may compare the network log information for the known digital artifact to the network log information corresponding to the current digital artifact. By determining the current digital artifact by comparing incoming network data corresponding to the current digital artifact to the incoming data of the known digital artifact, the system may identify a known vulnerability based on attributes including network traffic. Including analysis of network logs as a means to identify a known vulnerability increases the likelihood the system may match the current vulnerability to a known vulnerability, which may lead to an increased chance that a viable patch can be applied to secure the computing environment.

At step 706, process 700 (e.g., using one or more components described above) may determine a known vulnerability. For example, the system may determine a known vulnerability, wherein the known vulnerability comprises a known digital artifact and a public risk score. For example, the system may determine that an alert corresponds to a known vulnerability. The system may identify the known vulnerability as well as corresponding known digital artifacts and one or more public risk scores. For example, if a hospital suffers a ransomware attack, it may be possible for the system to receive an alert and identify one or more digital artifacts associated with the ransomware attack. After comparing the one or more digital artifacts associated with the ransomware attack to the known vulnerability the system may determine that the ransomware attack the hospital suffered is a result of a known vulnerability. The system may also provide additional known digital artifacts to increase the confidence in the vulnerability equivalence likelihood as well as obtain public risk scores associated with the known vulnerability. By determining a known vulnerability, the system may be able to gather additional information about the known vulnerability from multiple sources and use the additional information in conjunction with the counter or the rate of frequency to establish a more relevant and useful risk score for the vulnerability.

At step 708, process 700 (e.g., using one or more components described above) may determine whether the current alert is the known vulnerability. For example, the system may determine whether the current alert is the known vulnerability by comparing the current digital artifact to the known digital artifact. For example, if a current alert is a new file that is installed on a computer in a computing environment, the system may identify a current digital artifact as the hash of the new file and compare the hash of the new file with hashes of known pieces of malware. Based on if the hashes match, the system may be able to identify the type of malware installed via the vulnerability in the computer in the computing environment. By determining whether the current alert is the known vulnerability, the system may be able to accurately determine an accurate risk score in conjunction with a counter or a rate of frequency for use in ranking vulnerabilities within a computing environment.

At step 710, process 700 (e.g., using one or more components described above) may, based on determining that the current alert is caused by the known vulnerability, adjust the rate of frequency. For example, the system may, based on determining that the current alert is caused by the known vulnerability, adjust a rate of frequency, wherein the rate of frequency corresponds to a number of times the known vulnerability has been exploited over a period of time. For example, the system may determine a period of time of 7 days. The system may run for a period of 21 days. Within the 7-day period of time, the system may determine that the current alert is caused by a known vulnerability and keep track of each instance of the known vulnerability. At the end of the 21 days, the system may plot the three values representing the instances of the known vulnerability. The system may do this for a longer or shorter duration. Changing the period of time may affect the granularity of the data being gathered. The system may be tracking more than one known vulnerability within the computing environment based on the current alerts. By adjusting the rate of frequency, the system may be able to identify trends specific to the computing environment. Identifying the trends specific to the computing environment may help the system in determining the risk score for the known vulnerability.

At step 712, process 700 (e.g., using one or more components described above) may determine a risk score for the known vulnerability by leveraging the rate of frequency of the known vulnerability within the computing environment. For example, the system may determine a risk score and a valuation for the known vulnerability, wherein the risk score is based on the rate of frequency, the known digital artifact, and the public risk score, and wherein the valuation is based on the risk score. For example, the system may determine a risk score for the WannaCry ransomware based on the number of systems within a computing environment that have been infected with the ransomware over a period of time, and the system may observe the computing environment for a specific duration. For example, the system may identify the number of systems infected with ransomware in 3-day increments for 30 days. The risk score determined by the system may comprise the counter which indicates the number of instances of the WannaCry ransomware within a computing environment, the known digital artifacts associated with the WannaCry ransomware, and the public risk score associated with the WannaCry ransomware (e.g., NVD assigns a qualitative severity rating of HIGH to the WannaCry ransomware). By leveraging the rate of frequency of the known vulnerability within the computing environment, the system may be able to track trends specific to the computing environment, such as viruses detected within the computing environment, and the rate of spread of a worm within a computing environment. The system may be able to accurately assess the severity and impact of allowing a vulnerability to go unpatched. Additionally, the system may be able to generate a ranking of observed known vulnerabilities to ensure that resources dedicated to securing a computing environment are efficiently allocated. The system may also be able to predict future progressions of vulnerabilities within a computing system to better inform a security strategy to reduce consequences from a successfully exploited vulnerability within the computing environment.

At step 714, process 700 (e.g., using one or more components described above) may receive a plurality of proposed patches. For example, the system may receive a plurality of proposed patches, wherein at least a portion of the plurality of proposed patches fixes flaws in the computing environment. For example, the system may receive patches from security professionals through a portal. For example, the system may receive patches from online sources such as forums, security organizations, news organizations, or blog posts. For example, the system may receive patches by using a web scraper to identify keywords pertaining to a known vulnerability or identification numbers associated with the known vulnerability. By receiving a plurality of proposed patches, the system may be able to secure the environment by quickly finding patches that may fix the security vulnerability posed by the known vulnerability. Having a large number of patches from one or more sources may increase the likelihood that a proposed patch can be applied to the computing environment to fix the vulnerability.

At step 716, process 700 (e.g., using one or more components described above) may generate for display, on a user interface, a ranking of alerts. For example, the system may generate for display, on a user interface, a ranking of alerts, wherein the ranking of alerts comprises the current alert and the plurality of proposed patches, wherein the current alert is sorted by the risk score, wherein the plurality of proposed patches is sorted by a popularity metric, and wherein the popularity metric describes community support for each proposed patch in the plurality of proposed patches. For example, the system may be used in a SOC. A member of the SOC (e.g., a SOC analyst) may use the user interface ranking the alerts detected in the computing environment to triage alerts. For example, a SOC analyst may address the first alert in a ranking of alerts based on the high-risk score and a high number of proposed patches. In addressing the first alert, the SOC analyst may assess the highest popularity proposed patch and the second highest popularity proposed patch to ascertain the effectiveness of both solutions to patch the vulnerability in the computing environment. Based on the manual assessment, the SOC analyst may choose the first proposed patch to implement within the computing environment. By generating for display, on a user interface, a ranking of alerts, the system may provide a high-level overview of the security of a computing environment and a clear ranking of detected alerts and associated patches leading to a more secure computing environment and a clearer hierarchy of importance when addressing the alerts.

In some embodiments, the system may determine a selected patch after a period of time elapses for manual review. For example, the system may generate for the display, on the user interface, the ranking of alerts by determining a selected patch, wherein the selected patch is based on the popularity metric, wherein the popularity metric is determined after a period of time elapses, and wherein the period of time is determined based on the risk score and transmitting the selected patch for manual review, wherein the manual review comprises ensuring that the selected patch fixes vulnerabilities in the computing environment posed by the current alert. For example, the system may generate a user interface for use in a SOC and be accessible by members of a group (e.g., security analysts, a team at an organization, or another group of individuals sharing one or more attributes). The user interface may comprise a ranking of alerts and a popularity metric such that the popularity metric is determined based on input from members of the group for a specific period of time corresponding to the risk score. For example, the user interface may comprise the ranking of alerts and the popularity metric based on input from members of the group over a period of 5 days if the alert has a high-risk score. After the 5 days elapse, the system may transmit a selected patch (e.g., the highest popularity patch) to a SOC analyst for manual review. The SOC analyst may ensure that the system-selected patch fixes the vulnerability or vulnerabilities posed by the current alert. By determining a selected patch after a period of time elapses for manual review, the system may efficiently address alerts in the computing environment leading to a more secure computing environment.

In some embodiments, the system may determine a compensation amount for a selected patch. For example, the system may generate for the display, on the user interface, the ranking of alerts by determining a compensation amount for a selected patch, wherein the compensation amount corresponds to the risk score of the current alert, and wherein the selected patch corresponds to the popularity metric for a proposed patch in the plurality of proposed patches, transmitting the selected patch for manual review, wherein the manual review comprises ensuring that the selected patch fixes vulnerabilities in the computing environment posed by the current alert, and transmitting the compensation amount to an account associated with the selected patch. For example, the system may determine a compensation amount for a selected patch corresponding to the risk score assigned to the current alert and the popularity metric, transmit the patch for review, and transmit the compensation amount to an account associated with the selected patch. For example, the system may determine that a patch for a current alert is worth 1000 USD based on the risk score assigned to the current alert and the popularity metric. If a user proposes a patch that is very popular, the system may use the patch as the selected patch and transmit the selected patch for manual review (e.g., manual review by a SOC analyst). If the SOC analyst approves the patch for the current alert and applies the patch to the computing environment, the system may transmit 1000 USD to the user account associated with the selected patch. By determining a compensation amount for a selected patch, the system may incentivize patches to be submitted to the system and gamify the vulnerability patching process, thereby encouraging more users to participate in the process and increasing the likelihood that alerts are dealt with swiftly and accurately.

In some embodiments, the system may determine the compensation amount by using a response time metric and an efficiency metric. For example, the system may determine the compensation amount by determining a response time metric and an efficiency metric, wherein the response time metric describes an amount of time before the selected patch was submitted and when the current alert was observed in the computing environment, and wherein the efficiency metric describes changes that occur in the computing environment which result in slower operations after applying the selected patch, and determining the compensation amount for the selected patch, wherein the compensation amount further comprises the response time metric and the efficiency metric. For example, the system may receive a patch from a user within 3 days of identifying the current alert. The patch from the user may improve the efficiency of a computing environment by 0.5%. As such, the system may determine the compensation amount based on the 3 days elapsed and the 0.5% increase in efficiency. By determining the compensation amount by using a response time metric and an efficiency metric, the system may incentivize participants to respond quickly and provide patches that do not degrade the performance of devices or operations within the computing environment when a current alert is detected. This may be helpful in instances when the current alert has a high-risk score and a quick response time is critical to reducing the damages caused by the vulnerability.

It is contemplated that the steps or descriptions of FIG. 7 may be used with any other embodiment of this disclosure. In addition, the steps and descriptions described in relation to FIG. 7 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 7.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method, the method comprising: detecting a current alert in a computing environment; determining a current digital artifact corresponding to the current alert, wherein the current digital artifact comprises digital forensic evidence; determining a known vulnerability, wherein the known vulnerability comprises a known digital artifact and a public risk score; determining whether the current alert is the known vulnerability by comparing the current digital artifact to the known digital artifact; based on determining that the current alert is caused by the known vulnerability, incrementing a counter, wherein the counter corresponds to a number of times the known vulnerability has been exploited in the computing environment; determining a risk score for the known vulnerability, wherein the risk score is based on the counter, the known digital artifact and the public risk score; receiving a plurality of proposed patches, wherein at least a portion of the plurality of proposed patches fixes flaws in the computing environment; and generating for display, on a user interface, a ranking of alerts, wherein the ranking of alerts comprises the current alert and the plurality of proposed patches, wherein the current alert is sorted by the risk score, wherein the plurality of proposed patches are sorted by a popularity metric, and wherein the popularity metric describes community support for each proposed patch in the plurality of proposed patches.

2. The method of any one of the preceding embodiments, further comprising: receiving an additional digital artifact, wherein the additional digital artifact comprises additional information specific to the current alert; determining based on the current digital artifact and the additional digital artifact a vulnerability equivalence likelihood, wherein the vulnerability equivalence likelihood identifies how probable it is that the current alert is an instance of the known vulnerability; updating the risk score based on the vulnerability equivalence likelihood; and comparing the vulnerability equivalence likelihood to a threshold likelihood, wherein the threshold likelihood is a numeric value indicating a likelihood the vulnerability equivalence likelihood must meet or exceed before the current alert is manually reviewed.

3. The method of any one of the preceding embodiments, wherein determining the threshold likelihood comprises: determining a plurality of digital artifacts, wherein the plurality of digital artifacts comprises information specific to the current alert; retrieving a plurality of known digital artifacts, wherein the plurality of known digital artifacts comprises information specific to the known vulnerability; and generating the threshold likelihood based on how many digital artifacts from the plurality of digital artifacts and the plurality of known digital artifacts are equivalent.

4. The method of any one of the preceding embodiments, wherein determining the current digital artifact corresponding to the current alert further comprises: retrieving a network log corresponding to a time period of the current alert; querying the network log for ports corresponding to the current digital artifact; detecting a port corresponding to the current digital artifact that was used during the time period of the current alert; and comparing the port corresponding to the current digital artifact to the port associated with the known digital artifact.

5. The method of any one of the preceding embodiments, wherein determining the current digital artifact corresponding to the current alert further comprises: retrieving a network log corresponding to a time period of the current alert; querying the network log for geographical data corresponding to the current digital artifact; detecting a geographical region corresponding to the current digital artifact during the time period of the current alert; and comparing the geographical region corresponding to the current digital artifact to the geographical region of the known digital artifact.

6. The method of any one of the preceding embodiments, wherein determining the current digital artifact corresponding to the current alert further comprises: retrieving a user activity log corresponding to a time period of the current alert; querying the user activity log for abnormal user events corresponding to the current digital artifact; detecting an abnormality corresponding to the current digital artifact during the time period of the current alert, wherein the abnormality comprises behavior in the computing environment deviates from a baseline, and wherein the baseline comprises standard operations in the computing environment; and comparing the abnormality corresponding to the current digital artifact to the abnormality of the known digital artifact.

7. The method of any one of the preceding embodiments, wherein determining the current digital artifact corresponding to the current alert further comprises: retrieving a network log corresponding to a time period of the current alert; querying the network log for routing data corresponding to the current digital artifact; detecting a route corresponding to the current digital artifact during the time period of the current alert; and comparing the route corresponding to the current digital artifact to the route of the known digital artifact.

8. The method of any one of the preceding embodiments, wherein determining the current digital artifact corresponding to the current alert further comprises: retrieving a network log corresponding to a time period of the current alert; querying the network log for incoming data corresponding to the current digital artifact; detecting the incoming data corresponding to the current digital artifact during the time period of the current alert; and comparing the incoming data corresponding to the current digital artifact to the incoming data of the known digital artifact.

9. The method of any one of the preceding embodiments, wherein generating for the display, on the user interface, the ranking of alerts further comprises: determining a selected patch, wherein the selected patch is based on the popularity metric, wherein the popularity metric is determined after a period of time elapses, and wherein the period of time is determined based on the risk score; and transmitting the selected patch for manual review, wherein the manual review comprises ensuring that the selected patch fixes vulnerabilities in the computing environment posed by the current alert.

10. The method of any one of the preceding embodiments, wherein generating for the display, on the user interface, the ranking of alerts further comprises: determining a compensation amount for a selected patch, wherein the compensation amount corresponds to the risk score of the current alert, and wherein the selected patch corresponds to the popularity metric for a proposed patch in the plurality of proposed patches; transmitting the selected patch for manual review, wherein the manual review comprises ensuring that the selected patch fixes vulnerabilities in the computing environment posed by the current alert; and transmitting the compensation amount to an account associated with the selected patch.

11. The method of any one of the preceding embodiments, wherein determining the compensation amount further comprises: determining a response time metric and an efficiency metric, wherein the response time metric describes an amount of time before the selected patch was submitted and when the current alert was observed in the computing environment, and wherein the efficiency metric describes changes that occur in the computing environment which result in slower operations after applying the selected patch; and determining the compensation amount for the selected patch, wherein the compensation amount further comprises the response time metric and the efficiency metric.

12. The method of any one of the preceding embodiments, further comprising: detecting a current alert in a computing environment; determining a current digital artifact corresponding to the current alert, wherein the current digital artifact comprises digital forensic evidence; determining a known vulnerability, wherein the known vulnerability comprises a known digital artifact and a public risk score; determining whether the current alert is the known vulnerability by comparing the current digital artifact to the known digital artifact; based on determining that the current alert is caused by the known vulnerability, adjusting a rate of frequency, wherein the rate of frequency corresponds to a number of times the known vulnerability has been exploited over a period of time; determining a risk score and a valuation for the known vulnerability, wherein the risk score is based on the rate of frequency, the known digital artifact, and the public risk score, and wherein the valuation is based on the risk score; receiving a plurality of proposed patches, wherein at least a portion of the plurality of proposed patches fixes flaws in the computing environment; and generating for display, on a user interface, a ranking of alerts, wherein the ranking of alerts comprises the current alert and the plurality of proposed patches, wherein the current alert is sorted by the risk score, wherein the plurality of proposed patches are sorted by a popularity metric, and wherein the popularity metric describes community support for each proposed patch in the plurality of proposed patches.

13. The method of any one of the preceding embodiments, further comprising: receiving an additional digital artifact, wherein the additional digital artifact comprises additional information specific to the current alert, determining based on the current digital artifact and the additional digital artifact a vulnerability equivalence likelihood, wherein the vulnerability equivalence likelihood identifies how probable it is that the current alert is an instance of the known vulnerability, updating the risk score based on the vulnerability equivalence likelihood, and comparing the vulnerability equivalence likelihood to a threshold likelihood, wherein the threshold likelihood is a numeric value indicating a likelihood the vulnerability equivalence likelihood must meet or exceed before the current alert is manually reviewed.

14. The method of any one of the preceding embodiments, wherein determining the threshold likelihood comprises: determining a plurality of digital artifacts, wherein the plurality of digital artifacts comprises information specific to the current alert, retrieving a plurality of known digital artifacts, wherein the plurality of known digital artifacts comprises information specific to the known vulnerability, and generating the threshold likelihood based on how many digital artifacts from the plurality of digital artifacts and the plurality of known digital artifacts are equivalent.

15. The method of any one of the preceding embodiments, wherein determining the current digital artifact corresponding to the current alert further comprises: retrieving a network log corresponding to a time period of the current alert, querying the network log for ports corresponding to the current digital artifact, detecting a port corresponding to the current digital artifact that was used during the time period of the current alert, and comparing the port corresponding to the current digital artifact to the port associated with the known digital artifact.

16. The method of any one of the preceding embodiments, wherein determining the current digital artifact corresponding to the current alert further comprises: retrieving a network log corresponding to a time period of the current alert, querying the network log for geographical data corresponding to the current digital artifact, detecting a geographical region corresponding to the current digital artifact during the time period of the current alert, and comparing the geographical region corresponding to the current digital artifact to the geographical region of the known digital artifact.

17. The method of any one of the preceding embodiments, wherein determining the current digital artifact corresponding to the current alert further comprises: retrieving a user activity log corresponding to a time period of the current alert, querying the user activity log for abnormal user events corresponding to the current digital artifact, detecting an abnormality corresponding to the current digital artifact during the time period of the current alert, wherein the abnormality comprises behavior in the computing environment deviates from a baseline, and wherein the baseline comprises standard operations in the computing environment, and comparing the abnormality corresponding to the current digital artifact to the abnormality of the known digital artifact.

18. The method of any one of the preceding embodiments, wherein determining the current digital artifact corresponding to the current alert further comprises: retrieving a network log corresponding to a time period of the current alert, querying the network log for routing data corresponding to the current digital artifact, detecting a route corresponding to the current digital artifact during the time period of the current alert, and comparing the route corresponding to the current digital artifact to the route of the known digital artifact.

19. The method of any one of the preceding embodiments, wherein determining the current digital artifact corresponding to the current alert further comprises: retrieving a network log corresponding to a time period of the current alert, querying the network log for incoming data corresponding to the current digital artifact, detecting the incoming data corresponding to the current digital artifact during the time period of the current alert, and comparing the incoming data corresponding to the current digital artifact to the incoming data of the known digital artifact.

20. The method of any one of the preceding embodiments, wherein generating for the display, on the user interface, the ranking of alerts further comprises: determining a selected patch, wherein the selected patch is based on the popularity metric, wherein the popularity metric is determined after a period of time elapses, and wherein the period of time is determined based on the risk score, and transmitting the selected patch for manual review, wherein the manual review comprises ensuring that the selected patch fixes vulnerabilities in the computing environment posed by the current alert.

21. The method of any one of the preceding embodiments, wherein generating for the display, on the user interface, the ranking of alerts further comprises: determining a compensation amount for a selected patch, wherein the compensation amount corresponds to the risk score of the current alert, and wherein the selected patch corresponds to the popularity metric for a proposed patch in the plurality of proposed patches, transmitting the selected patch for manual review, wherein the manual review comprises ensuring that the selected patch fixes vulnerabilities in the computing environment posed by the current alert, and transmitting the compensation amount to an account associated with the selected patch.

22. The method of any one of the preceding embodiments, wherein determining the compensation amount further comprises: determining a response time metric and an efficiency metric, wherein the response time metric describes an amount of time before the selected patch was submitted and when the current alert was observed in the computing environment, and wherein the efficiency metric describes changes that occur in the computing environment which result in slower operations after applying the selected patch, and determining the compensation amount for the selected patch, wherein the compensation amount further comprises the response time metric and the efficiency metric.

23. A tangible, non-transitory, machine-readable medium storing instructions that, when executed by a data processing apparatus, cause the data processing apparatus to perform operations comprising those of any of embodiments 1-22.

24. A system comprising one or more processors; and memory storing instructions that, when executed by the processors, cause the processors to effectuate operations comprising those of any of embodiments 1-22.

25. A system comprising means for performing any of embodiments 1-22.

What is claimed is:

1. A system for determining risk scores for vulnerabilities by determining a number of attempted exploits on computing environments, the system comprising:
   one or more processors; and
   a non-transitory computer-readable medium comprising instructions that when executed by the one or more processors cause operations comprising:

detecting a current alert in a computing environment, wherein the current alert is an attempt to exploit a vulnerability in the computing environment, and wherein the vulnerability is a weakness in the computing environment;

determining a current digital artifact corresponding to the current alert, wherein the current digital artifact comprises current digital forensic evidence of the current alert;

determining a known vulnerability, wherein the known vulnerability comprises a known digital artifact and a public risk score, wherein the known digital artifact comprises known digital forensic evidence corresponding to the known vulnerability, and wherein the public risk score comprises public assessments of severity of security vulnerabilities in the computing environment;

determining whether the current alert is the known vulnerability, by comparing the current digital artifact to the known digital artifact;

based on determining that the current alert is caused by the known vulnerability, incrementing a counter, wherein the counter corresponds to a number of times the known vulnerability has been exploited in the computing environment;

determining a risk score for the known vulnerability, wherein the risk score is based on the counter, the known digital artifact and the public risk score;

receiving a plurality of proposed patches, wherein at least a portion of the plurality of proposed patches fixes flaws in the computing environment caused by the current alert; and generating for display, on a user interface, a ranking of alerts, wherein the ranking of alerts comprises the current alert and the plurality of proposed patches, wherein the current alert is sorted by the risk score, wherein the plurality of proposed patches are sorted by a popularity metric, and wherein the popularity metric describes community support for each proposed patch in the plurality of proposed patches, wherein generating for the display, on the user interface, the ranking of alerts further comprises:

determining a compensation amount for a selected patch in the plurality of proposed patches based on at least the risk score of the current alert and the popularity metric for the selected patch, wherein the compensation amount is a reward to a user that submitted the selected patch, in exchange for submitting the selected patch;

transmitting the selected patch for manual review, wherein the manual review comprises ensuring that the selected patch fixes vulnerabilities in the computing environment posed by the current alert; and transmitting the compensation amount to an account associated with the user that submitted the selected patch.

2. A method for determining risk scores for vulnerabilities by determining a number of attempted exploits in computing environments, the method comprising:

detecting a current alert in a computing environment;

determining a current digital artifact corresponding to the current alert, wherein the current digital artifact comprises digital forensic evidence;

determining a known vulnerability, wherein the known vulnerability comprises a known digital artifact and a public risk score;

determining whether the current alert is the known vulnerability by comparing the current digital artifact to the known digital artifact;

based on determining that the current alert is caused by the known vulnerability, incrementing a counter, wherein the counter corresponds to a number of times the known vulnerability has been exploited in the computing environment;

determining a risk score for the known vulnerability, wherein the risk score is based on the counter, the known digital artifact and the public risk score;

receiving a plurality of proposed patches, wherein at least a portion of the plurality of proposed patches fixes flaws in the computing environment; and generating for display, on a user interface, a ranking of alerts, wherein the ranking of alerts comprises the current alert and the plurality of proposed patches, wherein the current alert is sorted by the risk score, wherein the plurality of proposed patches are sorted by a popularity metric, and wherein the popularity metric describes community support for each proposed patch in the plurality of proposed patches, wherein generating for the display, on the user interface, the ranking of alerts further comprises:

determining a compensation amount for a selected patch in the plurality of proposed patches based on at least the risk score of the current alert and the popularity metric for the selected patch, wherein the compensation amount is a reward to a user that submitted the selected patch, in exchange for submitting the selected patch;

transmitting the selected patch for manual review, wherein the manual review comprises ensuring that the selected patch fixes vulnerabilities in the computing environment posed by the current alert; and transmitting the compensation amount to an account associated with the user that submitted the selected patch.

3. The method of claim 2, further comprising:

receiving an additional digital artifact, wherein the additional digital artifact comprises additional information specific to the current alert;

determining based on the current digital artifact and the additional digital artifact a vulnerability equivalence likelihood, wherein the vulnerability equivalence likelihood identifies how probable it is that the current alert is an instance of the known vulnerability;

updating the risk score based on the vulnerability equivalence likelihood; and comparing the vulnerability equivalence likelihood to a threshold likelihood, wherein the threshold likelihood is a numeric value indicating a likelihood the vulnerability equivalence likelihood must meet or exceed before the current alert is manually reviewed.

4. The method of claim 3, wherein determining the threshold likelihood comprises:

determining a plurality of digital artifacts, wherein the plurality of digital artifacts comprises information specific to the current alert;

retrieving a plurality of known digital artifacts, wherein the plurality of known digital artifacts comprises information specific to the known vulnerability; and generating the threshold likelihood based on how many digital artifacts from the plurality of digital artifacts and the plurality of known digital artifacts are equivalent.

5. The method of claim 2, wherein determining the current digital artifact corresponding to the current alert further comprises:
- retrieving a network log corresponding to a time period of the current alert;
- querying the network log for ports corresponding to the current digital artifact;
- detecting a port corresponding to the current digital artifact that was used during the time period of the current alert; and
- comparing the port corresponding to the current digital artifact to the port associated with the known digital artifact.

6. The method of claim 2, wherein determining the current digital artifact corresponding to the current alert further comprises:
- retrieving a network log corresponding to a time period of the current alert;
- querying the network log for geographical data corresponding to the current digital artifact;
- detecting a geographical region corresponding to the current digital artifact during the time period of the current alert; and
- comparing the geographical region corresponding to the current digital artifact to the geographical region of the known digital artifact.

7. The method of claim 2, wherein determining the current digital artifact corresponding to the current alert further comprises:
- retrieving a user activity log corresponding to a time period of the current alert;
- querying the user activity log for abnormal user events corresponding to the current digital artifact;
- detecting an abnormality corresponding to the current digital artifact during the time period of the current alert, wherein the abnormality comprises behavior in the computing environment deviates from a baseline, and wherein the baseline comprises standard operations in the computing environment; and
- comparing the abnormality corresponding to the current digital artifact to the abnormality of the known digital artifact.

8. The method of claim 2, wherein determining the current digital artifact corresponding to the current alert further comprises:
- retrieving a network log corresponding to a time period of the current alert;
- querying the network log for routing data corresponding to the current digital artifact;
- detecting a route corresponding to the current digital artifact during the time period of the current alert; and
- comparing the route corresponding to the current digital artifact to the route of the known digital artifact.

9. The method of claim 2, wherein determining the current digital artifact corresponding to the current alert further comprises:
- retrieving a network log corresponding to a time period of the current alert;
- querying the network log for incoming data corresponding to the current digital artifact;
- detecting the incoming data corresponding to the current digital artifact during the time period of the current alert; and
- comparing the incoming data corresponding to the current digital artifact to the incoming data of the known digital artifact.

10. The method of claim 2, wherein generating for the display, on the user interface, the ranking of alerts further comprises:
- determining a selected patch, wherein the selected patch is based on the popularity metric, wherein the popularity metric is determined after a period of time elapses, and wherein the period of time is determined based on the risk score; and
- transmitting the selected patch for manual review, wherein the manual review comprises ensuring that the selected patch fixes vulnerabilities in the computing environment posed by the current alert.

11. The method of claim 2, wherein determining the compensation amount further comprises:
- determining a response time metric and an efficiency metric, wherein the response time metric describes an amount of time before the selected patch was submitted and when the current alert was observed in the computing environment, and wherein the efficiency metric describes changes that occur in the computing environment which result in slower operations after applying the selected patch; and
- determining the compensation amount for the selected patch based on at least the risk score of the current alert and the popularity metric for the selected patch, wherein the compensation amount is further based on the response time metric and the efficiency metric.

12. A non-transitory, computer-readable medium comprising instructions recorded thereon that when executed by one or more processors causes operations comprising:
- detecting a current alert in a computing environment;
- determining a current digital artifact corresponding to the current alert, wherein the current digital artifact comprises digital forensic evidence;
- determining a known vulnerability, wherein the known vulnerability comprises a known digital artifact and a public risk score;
- determining whether the current alert is the known vulnerability by comparing the current digital artifact to the known digital artifact;
- based on determining that the current alert is caused by the known vulnerability, incrementing a counter, wherein the counter corresponds to a number of times the known vulnerability has been exploited in the computing environment;
- determining a risk score for the known vulnerability, wherein the risk score is based on the counter, the known digital artifact and the public risk score;
- receiving a plurality of proposed patches, wherein at least a portion of the plurality of proposed patches fixes flaws in the computing environment; and
- generating for display, on a user interface, a ranking of alerts, wherein the ranking of alerts comprises the current alert and the plurality of proposed patches, wherein the current alert is sorted by the risk score, wherein the plurality of proposed patches are sorted by a popularity metric, and wherein the popularity metric describes community support for each proposed patch in the plurality of proposed patches, wherein generating for the display, on the user interface, the ranking of alerts further comprises:
  - determining a compensation amount for a selected patch in the plurality of proposed patches based on at least the risk score of the current alert and the popularity metric for the selected patch, wherein the compensation amount is a reward to a user that submitted the selected patch, in exchange for submitting the selected patch;
transmitting the selected patch for manual review, wherein the manual review comprises ensuring that the selected patch fixes vulnerabilities in the computing environment posed by the current alert; and
transmitting the compensation amount to an account associated with the user that submitted the selected patch.

13. The non-transitory, computer-readable medium of claim 12, further comprising:
receiving an additional digital artifact, wherein the additional digital artifact comprises additional information specific to the current alert;
determining based on the current digital artifact and the additional digital artifact a vulnerability equivalence likelihood, wherein the vulnerability equivalence likelihood identifies how probable it is that the current alert is an instance of the known vulnerability;
updating the risk score based on the vulnerability equivalence likelihood; and
comparing the vulnerability equivalence likelihood to a threshold likelihood, wherein the threshold likelihood is a numeric value indicating a likelihood the vulnerability equivalence likelihood must meet or exceed before the current alert is manually reviewed.

14. The non-transitory, computer-readable medium of claim 13, wherein determining the threshold likelihood comprises:
determining a plurality of digital artifacts, wherein the plurality of digital artifacts comprises information specific to the current alert;
retrieving a plurality of known digital artifacts, wherein the plurality of known digital artifacts comprises information specific to the known vulnerability; and
generating the threshold likelihood based on how many digital artifacts from the plurality of digital artifacts and the plurality of known digital artifacts are equivalent.

15. The non-transitory, computer-readable medium of claim 12, wherein determining the current digital artifact corresponding to the current alert further comprises:
retrieving a network log corresponding to a time period of the current alert;
querying the network log for ports corresponding to the current digital artifact;
detecting a port corresponding to the current digital artifact that was used during the time period of the current alert; and
comparing the port corresponding to the current digital artifact to the port associated with the known digital artifact.

16. The non-transitory, computer-readable medium of claim 12, wherein determining the current digital artifact corresponding to the current alert further comprises:
retrieving a network log corresponding to a time period of the current alert;
querying the network log for geographical data corresponding to the current digital artifact;
detecting a geographical region corresponding to the current digital artifact during the time period of the current alert; and
comparing the geographical region corresponding to the current digital artifact to the geographical region of the known digital artifact.

17. The non-transitory, computer-readable medium of claim 12, wherein determining the current digital artifact corresponding to the current alert further comprises:
retrieving a user activity log corresponding to a time period of the current alert;
querying the user activity log for abnormal user events corresponding to the current digital artifact;
detecting an abnormality corresponding to the current digital artifact during the time period of the current alert, wherein the abnormality comprises behavior in the computing environment deviates from a baseline, and wherein the baseline comprises standard operations in the computing environment; and
comparing the abnormality corresponding to the current digital artifact to the abnormality of the known digital artifact.

18. The non-transitory, computer-readable medium of claim 12, wherein determining the current digital artifact corresponding to the current alert further comprises:
retrieving a network log corresponding to a time period of the current alert;
querying the network log for routing data corresponding to the current digital artifact;
detecting a route corresponding to the current digital artifact during the time period of the current alert; and
comparing the route corresponding to the current digital artifact to the route of the known digital artifact.

19. The non-transitory, computer-readable medium of claim 12, wherein determining the current digital artifact corresponding to the current alert further comprises:
retrieving a network log corresponding to a time period of the current alert;
querying the network log for incoming data corresponding to the current digital artifact;
detecting the incoming data corresponding to the current digital artifact during the time period of the current alert; and
comparing the incoming data corresponding to the current digital artifact to the incoming data of the known digital artifact.

* * * * *